(12) United States Patent
Tsunokawa et al.

(10) Patent No.: US 7,669,215 B2
(45) Date of Patent: Feb. 23, 2010

(54) INFORMATION PROCESSING APPARATUS, INFORMATION PROCESSING METHOD AND PROGRAM

(75) Inventors: Motoki Tsunokawa, Kanagawa (JP); Shunji Yoshimura, Tokyo (JP); Toshiharu Yabe, Tokyo (JP); Nobuyuki Fujiwara, Kanagawa (JP); Tatsuya Narahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 386 days.

(21) Appl. No.: 11/443,217

(22) Filed: May 31, 2006

(65) Prior Publication Data

US 2006/0288369 A1    Dec. 21, 2006

(30) Foreign Application Priority Data

Jun. 16, 2005  (JP)  ............................. 2005-176517

(51) Int. Cl.
*G06F 3/00*     (2006.01)
*G06F 13/00*    (2006.01)
*H04N 5/445*    (2006.01)

(52) U.S. Cl. ........................... 725/46; 345/156; 725/34; 725/47; 725/59

(58) Field of Classification Search ............. 725/34–61; 345/156

See application file for complete search history.

(56) References Cited

U.S. PATENT DOCUMENTS 7,055,168 B1* 5/2006 Errico et al. .................. 725/46

2002/0062481 A1* 5/2002 Slaney et al. .................. 725/42
2003/0093784 A1* 5/2003 Dimitrova et al. ............. 725/10
2003/0151554 A1* 8/2003 McCarthy .................... 342/450
2003/0172381 A1   9/2003 Janevski

FOREIGN PATENT DOCUMENTS

| JP | 2001-86497 | 3/2001 |
|---|---|---|
| JP | 2003-6555 | 1/2003 |
| JP | 2003-18580 | 1/2003 |
| JP | 2003-32660 | 1/2003 |
| JP | 2003-61071 | 2/2003 |
| JP | 2004-318614 | 11/2004 |
| JP | 2005-84770 | 3/2005 |
| JP | 2005-516488 | 6/2005 |

* cited by examiner

*Primary Examiner*—David L Lewis
(74) *Attorney, Agent, or Firm*—Oblon, Spivak, McClelland, Maier & Neustadt, L.L.P.

(57) ABSTRACT

An information processing apparatus which creates a predetermined piece of programming, including: a taste information acquiring module which acquires taste information showing user's tastes; a material information acquiring module which acquires a component configuring the piece of programming as material information; a construction information acquiring module which acquires construction information that describes a construction of the piece of programming and includes a motion of the component in the piece of programming; and a creating module which creates the piece of programming based on the taste information, the material information, and the construction information.

20 Claims, 26 Drawing Sheets

| PROGRAMMING NAME | GENRE | TYPES OF PROGRAMMING |
|---|---|---|
| YUKI SATO'S FIVE MINUTE NEWS | NEWS | CREATE |
| HAPPY FRIENDS | DRAMA | CREATE |
| SOCCER WORLD CUP | SPORTS | BROADCAST |
| THE CURRENT MUSIC CHART TOP 30 | MUSIC | CREATE |
| A × Z | VARIETY | BROADCAST |
| YUMI SUZUKI'S SHOPPING! | SHOPPING | CREATE |
| KIJITAKU'S NEWS COMMENTS | NEWS | CREATE |
| SUPER TEACHER STORY | DRAMA | CREATE |
| AND SO ON | AND SO ON | AND SO ON |

1: TITLE: [CASTER'S] FIVE MINUTE NEWS
2: GENRE: NEWS
3: LENGTH: 5 MIN.
4: CONSTRUCTION:
5:   NEWS COLUMN
6:     HEADLINE
7:       LENGTH: 10 SEC.
8:       CONTENTS: FROM A NEWS WEB SITE,
9:         ACQUIRE INFORMATION ABOUT TEN ITEMS OF MAJOR NEWS PLUS THREE ITEMS OF
10:        MINOR NEWS BASED ON TASTE INFORMATION AND DISPLAY IT AS A HEADLINE
11:    READ NEWS
12:      LENGTH:  3 MIN. 50 SEC.
13:      CONTENTS: ACQUIRE DETAILED INFORMATION ABOUT EACH ITEM OF NEWS AND
                   CASTER'S CHARACTER INFORMATION DISPLAYED AT THE HEADLINE AND
14:                READ THE DETAIL OF THE NEWS BY THE CASTER WHILE DISPLAYING
                   DETAILED INFORMATION ABOUT NEWS
15: WEATHER FORECAST COLUMN
16:   WEATHER MAP
17:     LENGTH: 10 SEC.
18:     CONTENTS: ACQUIRE A NATIONWIDE WEATHER MAP FROM A WEATHER FORECAST WEB
                 SITE AND DISPLAY IT AND GIVE COMMENTS BY A CASTER
19:   WEATHER FORECAST
20:     LENGTH:   40 SEC.
21:     CONTENTS: ACQUIRE WEATHER FORECAST, HUMIDITY, AND A CHANCE OF PRECIPITATION
                 IN THE USER RESIDENTIAL AREA FROM A WEATHER FORECAST WEB SITE
22:              AND DISPLAY THEM AND READ THEM BY A CASTER
23:   POLLEN INFORMATION
24:     LENGTH:   10 SEC.
25:     CONTENTS: ACQUIRE POLLEN DRIFT INFORMATION ABOUT THE USER RESIDENTIAL AREA
                 FROM A POLLEN INFORMATION WEB SITE AND DISPLAY IT AND
26:              READ IT BY A CASTER

FIG. 8
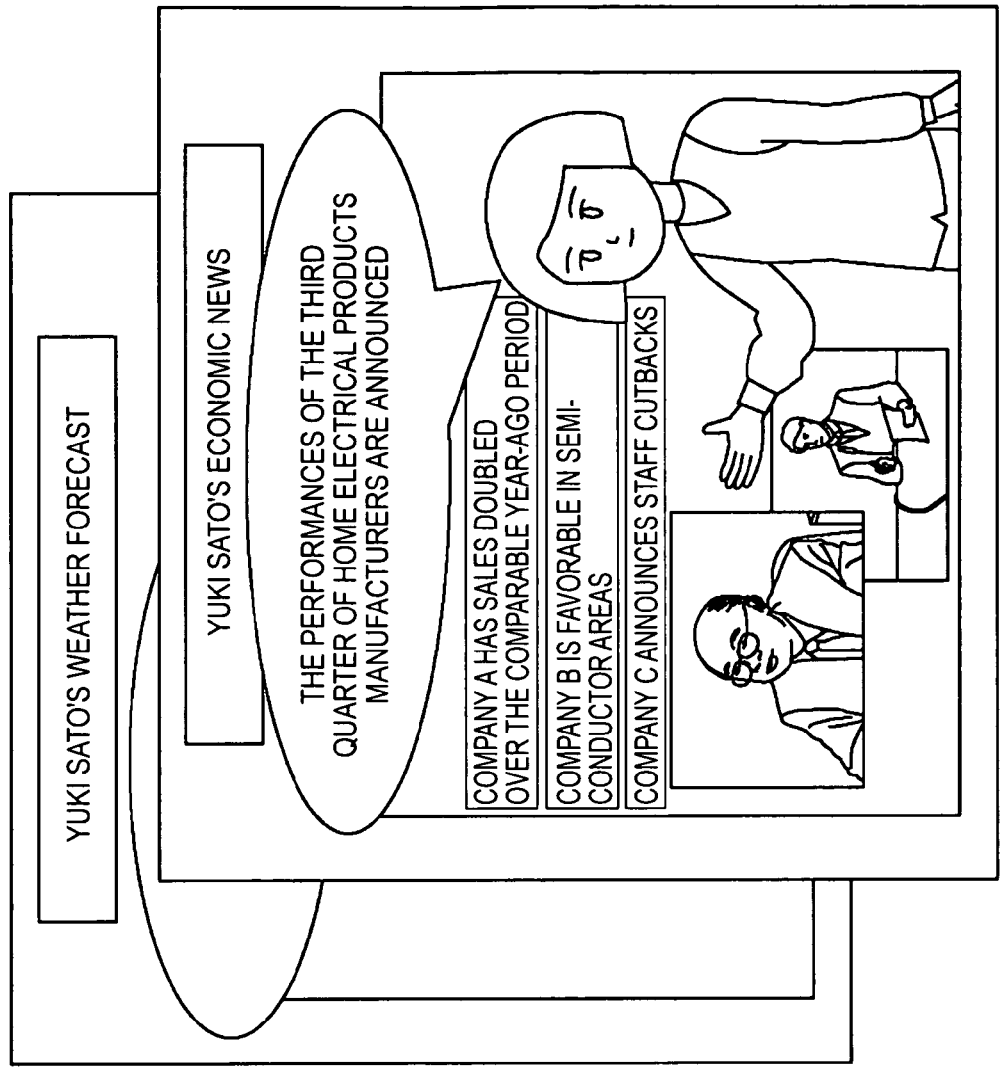
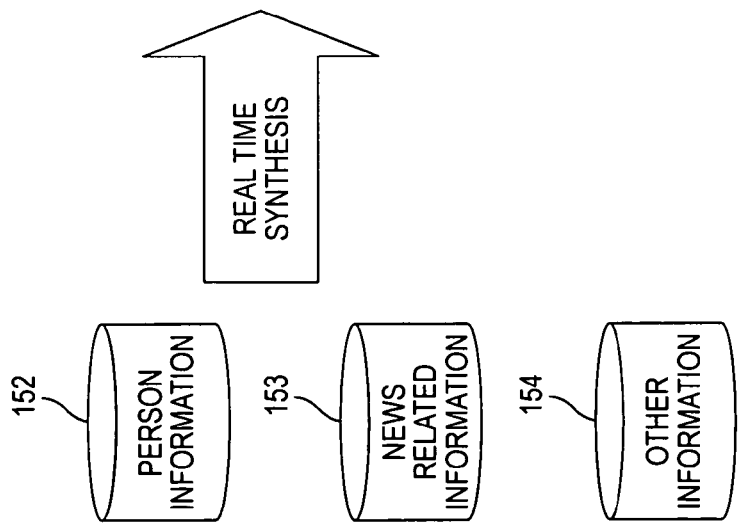

FIG. 9

1: TITLE: HAPPY FRIENDS
2: GENRE: DRAMA (LOVE STORY)
3: LENGTH: 50 MIN.
4: CONSTRUCTION:
5:   CAST INFORMATION:
6:     CHARACTER A: NAME, GENDER, AGE, OCCUPATION, LOOKS, PERSONALITY, ETC.
7:     CHARACTER B: NAME, GENDER, AGE, OCCUPATION, LOOKS, PERSONALITY, ETC.
8:   SCENE 1:
9:     LENGTH: 30 SEC.
10:    LOCATION: XXX
11:    TIME: XXX
12:    ACTION: XXX
13:    DIALOGUE: XXX
14:   SELECT 1
15:    MOVE TO SCENE 2, IF TASTE INFORMATION IS XXX, OR MOVE TO SCENE 10, IF TASTE INFORMATION IS OTHER THAN XXX
16:   SCENE 2

FIG. 10
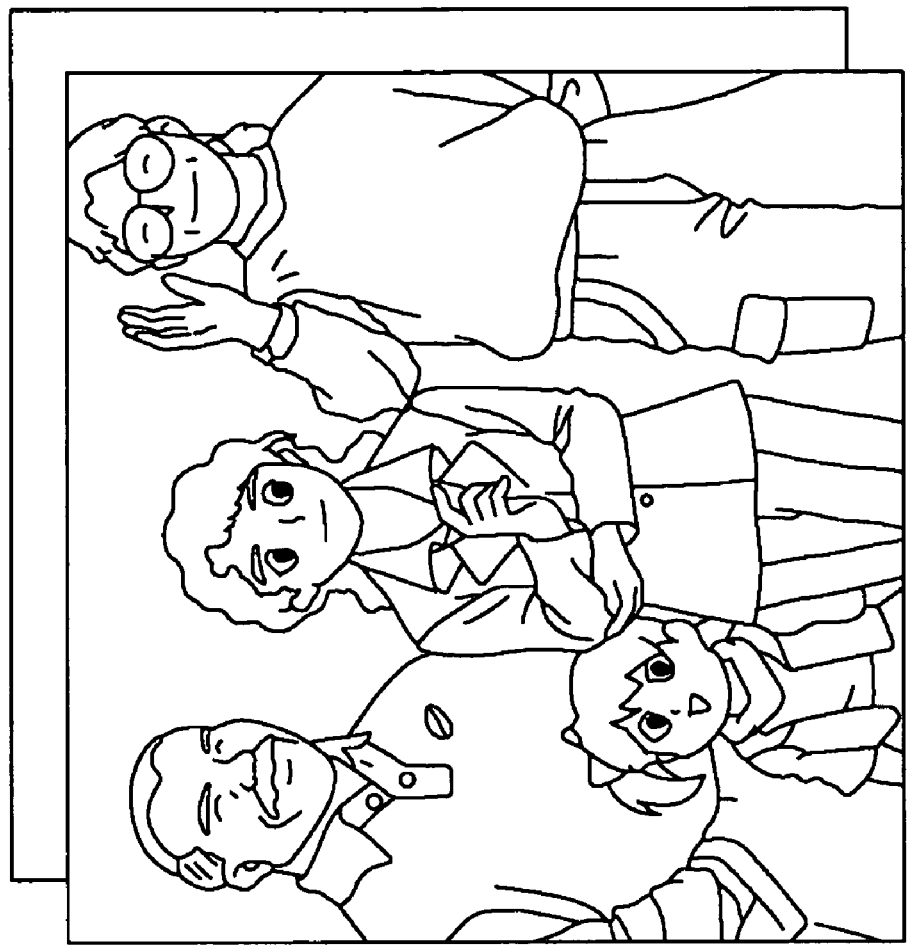
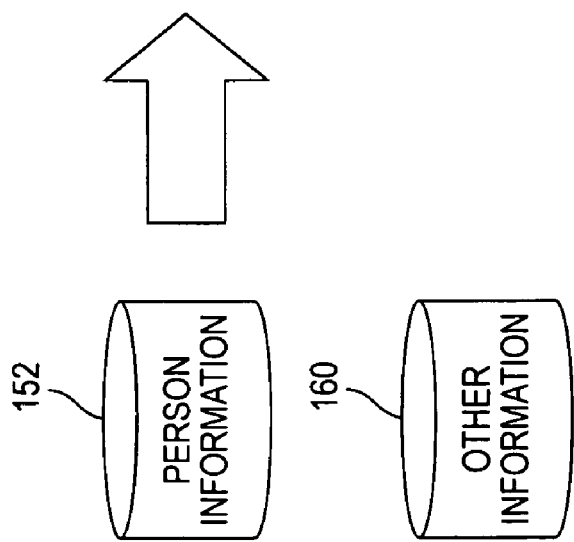

FIG. 11

```
 1: TITLE: THE CURRENT MUSIC CHART TOP 30
 2: GENRE: MUSIC
 3: LENGTH: 30 MIN.
 4: CONSTRUCTION
 5:   NEW RELEASE COLUMN
 6:     SELECTION
 7:       LENGTH: 10 SEC.
 8:       CONTENTS: FROM A MUSIC WEB SITE, BASED ON THE TASTE INFORMATION,
 9:                 DISPLAY 10 NEW RELEASES THIS WEEK
10:     READ
11:       LENGTH: 4 MIN. 50 SEC.
12:       CONTENTS: THE MASTER OF CEREMONIES READS DETAILED INFORMATION ABOUT EACH
13:                 SONG DISPLAYED AT SELECTION WHILE ACQUIRING AND DISPLAYING IT
14:   RANKING COLUMN
15:     LENGTH: 20 MIN.
16:     CONTENTS: ACQUIRE 30 SONGS IN DESCENDING ORDER OF WHICH ARE MOST TO LEAST
17:               LISTENED FROM A MUSIC WEB SITE, ASSIGN RANKS TO THE SONGS IN
                  DESCENDING ORDER, DISPLAY 10 SONGS EACH IN ASCENDING ORDER OF
                  WHICH ARE LEAST TO MOST LISTENED AS THE RANKING, AND
18:               GIVE COMMENTS BY THE MASTER OF CEREMONIES
19:   ADVANCE NOTICE COLUMN
20:     SELECTION
21:       LENGTH: 10 SEC.
22:       CONTENTS: FROM A MUSIC WEB SITE, BASED ON THE TASTE INFORMATION,
23:                 DISPLAY 10 SONGS TO BE RELEASED NEXT WEEK
24:     READ
25:       LENGTH: 4 MIN. 50 SEC.
26:       CONTENTS: THE MASTER OF CEREMONIES READS DETAILED INFORMATION ABOUT EACH
27:                 SONG DISPLAYED AT SELECTION WHILE ACQUIRING AND DISPLAYING IT
```

FIG. 12
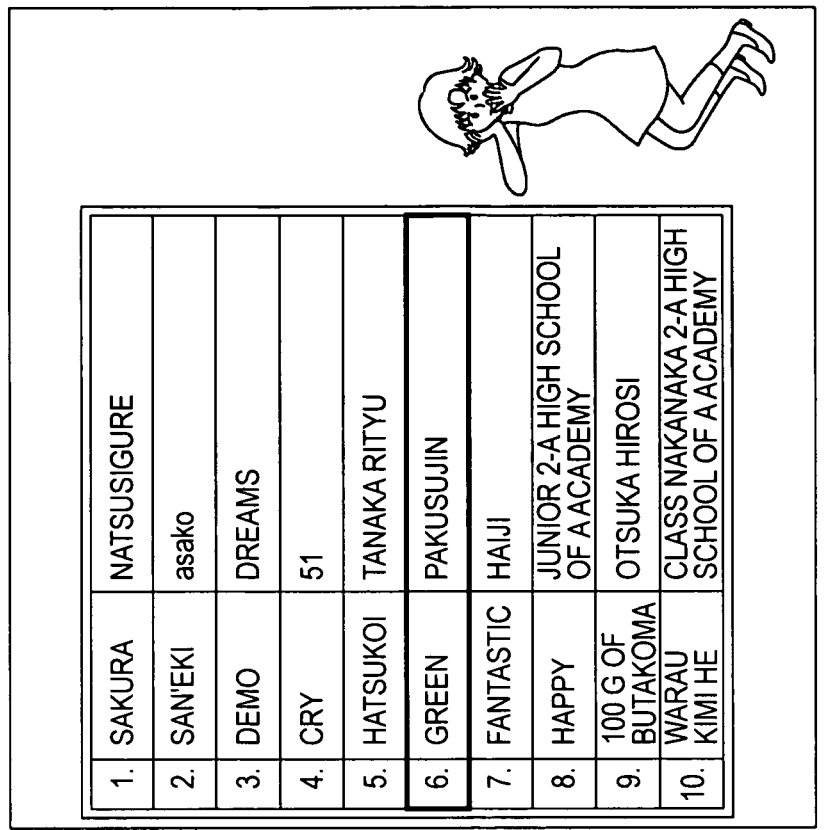
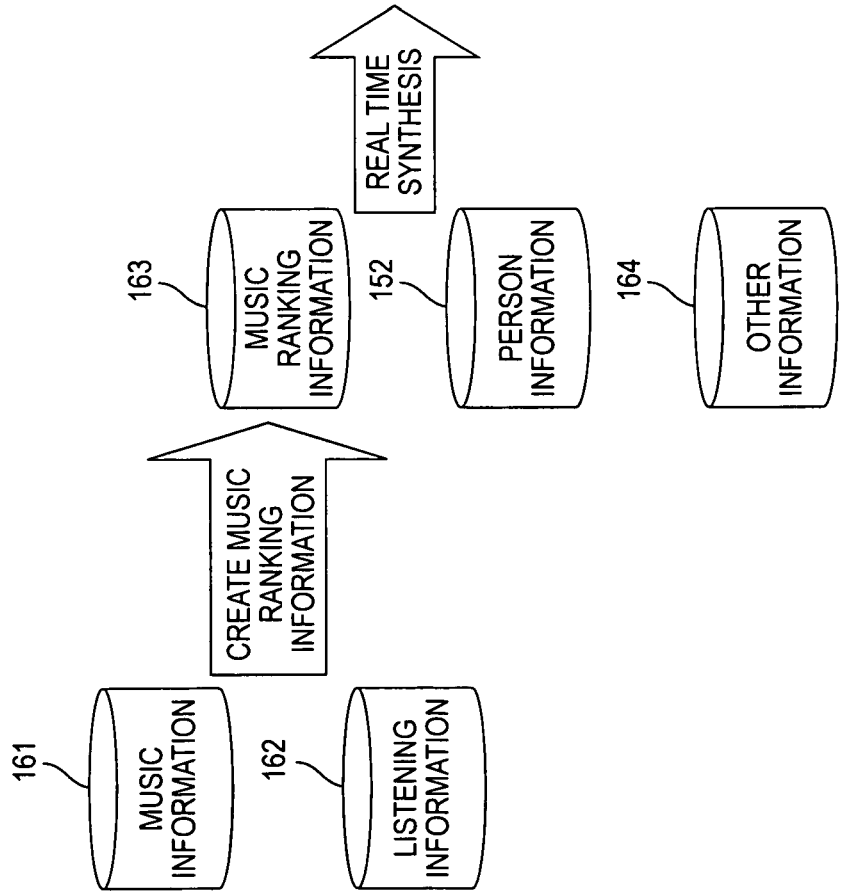

FIG. 13

1: TITLE: [MC'S] SHOPPING!
2: GENRE: SHOPPING
3: LENGTH: 10MIN.
4: CONSTRUCTION
5:   SELECTION
6:     LENGTH: 10 SEC.
7:     CONTENTS: FROM A SHOPPING WEB SITE, BASED ON TASTE INFORMATION,
8:     SELECT AND DISPLAY FIVE PRODUCTS
9:   READ
10:     LENGTH: 4 MIN. 50 SEC.
11:     CONTENTS: GIVE COMMENTS BY THE MASTER OF CEREMONIES
12:              WHILE DISPLAYING FIVE PRODUCTS DISPLAYED AT SELECTION ONE BY ONE

FIG. 15

| DEVICES | ACQUIRED INFORMATION | EXEMPLARY DETERMINATIONS | | |
|---|---|---|---|---|
| | | DRAMA PROGRAMMING | MUSIC PROGRAMMING | SPORTS PROGRAMMING |
| CAMERA | BODY MOTION | WHEN SMALL, RAISE THE DEGREE OF TASTES, WHEREAS WHEN THE USER FREQUENTLY LEAVES THE SEAT, DROP THE DEGREE OF TASTES | DETERMINATION IS NOT MADE | DETERMINATION IS NOT MADE |
| MICROPHONE | LOUDNESS OF VOICE | DETERMINATION IS NOT MADE | WHEN SMALL, RAISE THE DEGREE OF TASTES | DETERMINATION IS NOT MADE |
| THERMOSENSOR | TEMPERATURE | DETERMINATION IS NOT MADE | DETERMINATION IS NOT MADE | WHEN INCREASED, RAISE THE DEGREE OF TASTES |
| REMOTE CONTROL | VOLUME OPERATION | DETERMINATION IS NOT MADE | WHEN INCREASED, RAISE THE DEGREE OF TASTES | DETERMINATION IS NOT MADE |
| | LISTENING HISTORY | WHEN WATCHED, RAISE THE DEGREE OF TASTES | | |
| | RESERVE HISTORY | WHEN RESERVED, RAISE THE DEGREE OF TASTES | | |
| | REPLAY HISTORY | WHEN PLAYED, RAISE THE DEGREE OF TASTES | | |

FIG. 24

1: TITLE: SANGOKU'S BEST SCENES
2: GENRE: GAME
3: LENGTH: 5 MN.
4: CONSTRUCTION
5:   SCENE 1
6:     LENGTH: 3 MIN.
7:     CONTENTS: ACQUIRE AND DISPLAY GAME INFORMATION
8:                WHEN A USER WINS A COMMANDER OF RANK A
9:   SCENE 2
10:    LENGTH: 3 MIN.
11:    CONTENTS: ACQUIRE AND DISPLAY GAME INFORMATION
12:               WHEN A USER WINS A COMMANDER OF RANK B

FIG. 25
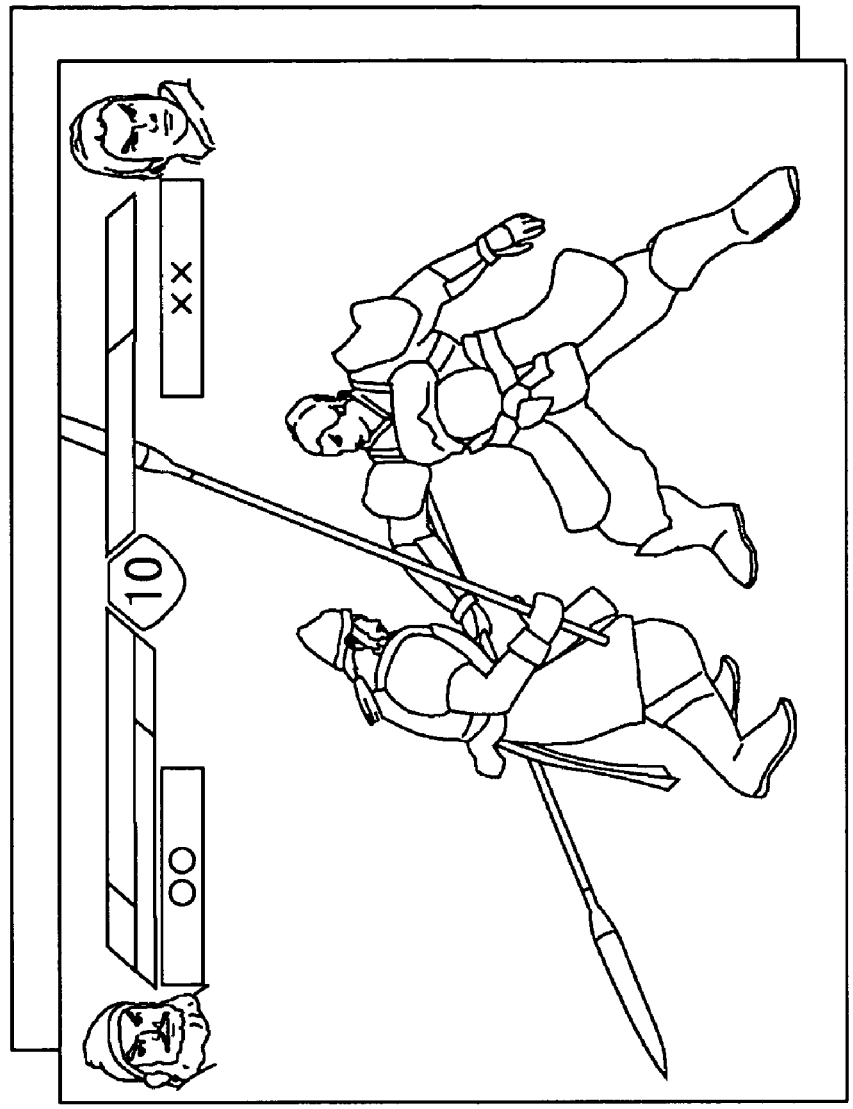
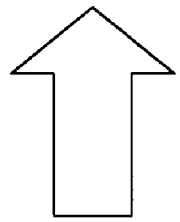
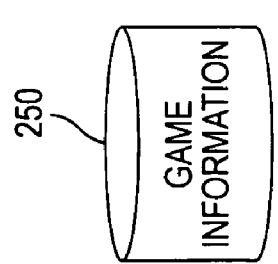

INFORMATION PROCESSING APPARATUS, INFORMATION PROCESSING METHOD AND PROGRAM

CROSS REFERENCE TO RELATED APPLICATIONS

The present invention contains subject matter related to Japanese Patent Application JP 2005-176517 filed in the Japanese Patent Office on Jun. 16, 2005, the entire contents of which being incorporated herein by reference.

BACKGROUND OF THE INVENTION

1. Field of the Invention

The present invention relates to an information processing apparatus, an information processing method, and a program, particularly to an information processing apparatus, an information processing method, and a program which allow creating a piece of programming that a user likes.

2. Description of the Related Art

In television related devices before such as a television set and a video recorder, a user has to select a desired piece of programming from an electric program list, which is troublesome. In recent years, an apparatus becomes wide spread which automatically records pieces of programming that a user likes based on user's tastes.

However, in such a recorder, when a piece of programming is not broadcast that a user particularly likes, the user watches a piece of programming that the user does not like so much, or the user will not watch any pieces of programming at all. Then, an apparatus is desired which creates a piece of programming that a user particularly likes and provides it to the user when no piece of programming is broadcast that the user particularly watches.

For a method which creates contents such as a piece of programming, various methods are known. Here, contents are digital data such as text, music, an image, or the combination thereof.

For example, there is a terminal device which selects contents to be a material based on user's tastes and combines the contents to be the material to create contents that the user likes (for example, see Patent reference 1). In addition, there is a terminal device which creates new contents in which contents to be a material are obtained and played in accordance with information about the replay of contents to be a material (for example, see Patent reference 2).

Patent reference 1: JP-A-2003-61071
Patent reference 2: JP-A-2003-6555

SUMMARY OF THE INVENTION

However, in the terminal devices described in Patent references 1 and 2, since the contents to be a material themselves are combined to create new contents, there are limitations on the contents to create.

More specifically, in the terminal devices like them, it is difficult to create various pieces of programming. For example, in the terminal devices described in Patent references 1 and 2, it is difficult to create a piece of programming in which a person or an object corresponding to the contents to be a material performs in various manners. Consequently, the terminal devices may not create a piece of programming that a user likes.

The invention has been made in view of the circumstances. It is desirable to allow creating a piece of programming that a user likes.

An information processing apparatus according to an embodiment of the invention includes: a taste information acquiring module which acquires taste information showing user's tastes; a material information acquiring module which acquires a component configuring the piece of programming as material information; a construction information acquiring module which acquires construction information that describes a construction of the piece of programming and includes a motion of the component in the piece of programming; and a creating module which creates the piece of programming based on the taste information, the material information, and the construction information.

The construction information acquiring module can acquire the construction information based on the taste information.

The material information acquiring module can acquire the material information based on the taste information.

The construction information acquiring module can acquire the construction information based on the taste information.

The information processing apparatus is further provided with a creating module which creates the taste information based on input information inputted by a user while the piece of programming is being watched, wherein the taste information acquiring module can acquire taste information created at the creating module; and the creating module can create the piece of programming based on taste information created in accordance with input information inputted by the user who is watching the piece of programming, the material information, and the construction information, while the piece of programming is being created.

The construction information acquiring module can further edit the construction information based on the taste information; and the creating module can create the piece of programming based on the taste information, the material information, and construction information edited at the construction information acquiring module.

An information processing method according to an embodiment of the invention includes: a taste information acquiring step which acquires taste information showing user's tastes; a material information acquiring step which acquires a component configuring a piece of programming as material information; a construction information acquiring step which acquires construction information that describes a construction of the piece of programming and includes a motion of the component in the piece of programming; and a creating step which creates the piece of programming based on the taste information, the material information, and the construction information.

In an embodiment of the invention, the taste information showing user's tastes is acquired, the component configuring the piece of programming is acquired as the material information, and the construction information that describes the construction of the piece of programming and includes the motion of the component in the piece of programming is acquired. Then, the piece of programming is created based on the taste information, the material information, and the construction information.

According to an embodiment of the invention, a piece of programming that a user likes can be created.

BRIEF DESCRIPTION OF THE DRAWINGS

The teachings of the invention can be readily understood by considering the following detailed description in conjunction with the accompanying drawings, in which:

FIG. 6 shows diagram illustrating exemplary time schedule information about a piece of news programming;

FIG. 8 shows a diagram illustrative of a piece of news programming;

FIG. 9 shows a diagram illustrating exemplary time schedule information about a piece of drama programming;

FIG. 10 shows a diagram illustrative of a piece of drama programming;

FIG. 11 shows a diagram illustrating exemplary time schedule information about a piece of music programming;

FIG. 12 shows a diagram illustrative of a piece of music programming;

FIG. 13 shows a diagram illustrating exemplary time schedule information about a piece of shopping programming;

FIG. 15 shows a diagram illustrative of a piece of taste information;

FIG. 24 shows a diagram illustrating exemplary time schedule information about a piece of game programming;

FIG. 25 shows a diagram illustrative of a piece of game programming; and

DETAILED DESCRIPTION OF THE INVENTION

Hereinafter, an embodiment of the invention will be described. The correspondence between the requirements described in the embodiment of the invention and specific examples in the embodiment of the invention is as follows. This description is intended to confirm that the specific examples to support the inventions described in the embodiment of the invention are described in the embodiment of the invention. Therefore, even though there are specific examples which are described in the embodiment of the invention but are not described here as those corresponding to the requirements, it does not mean that the specific examples do not correspond to the requirements. Reversely, even though specific examples are described here as those corresponding to the requirements, it does not mean that the specific examples do not correspond to requirements other than those requirements.

Furthermore, this description does not mean that all the inventions corresponding to the specific examples described in the embodiment of the invention are not described in the embodiment of the invention. In other words, this description is the inventions corresponding to the specific examples described in the embodiment of the invention, which will not deny the existence of the inventions that are not described in an embodiment of the invention according to the present patent application, that is, which will not deny the existence of the inventions that will be filed as divisional applications or added by amendment in future.

Figure 3:
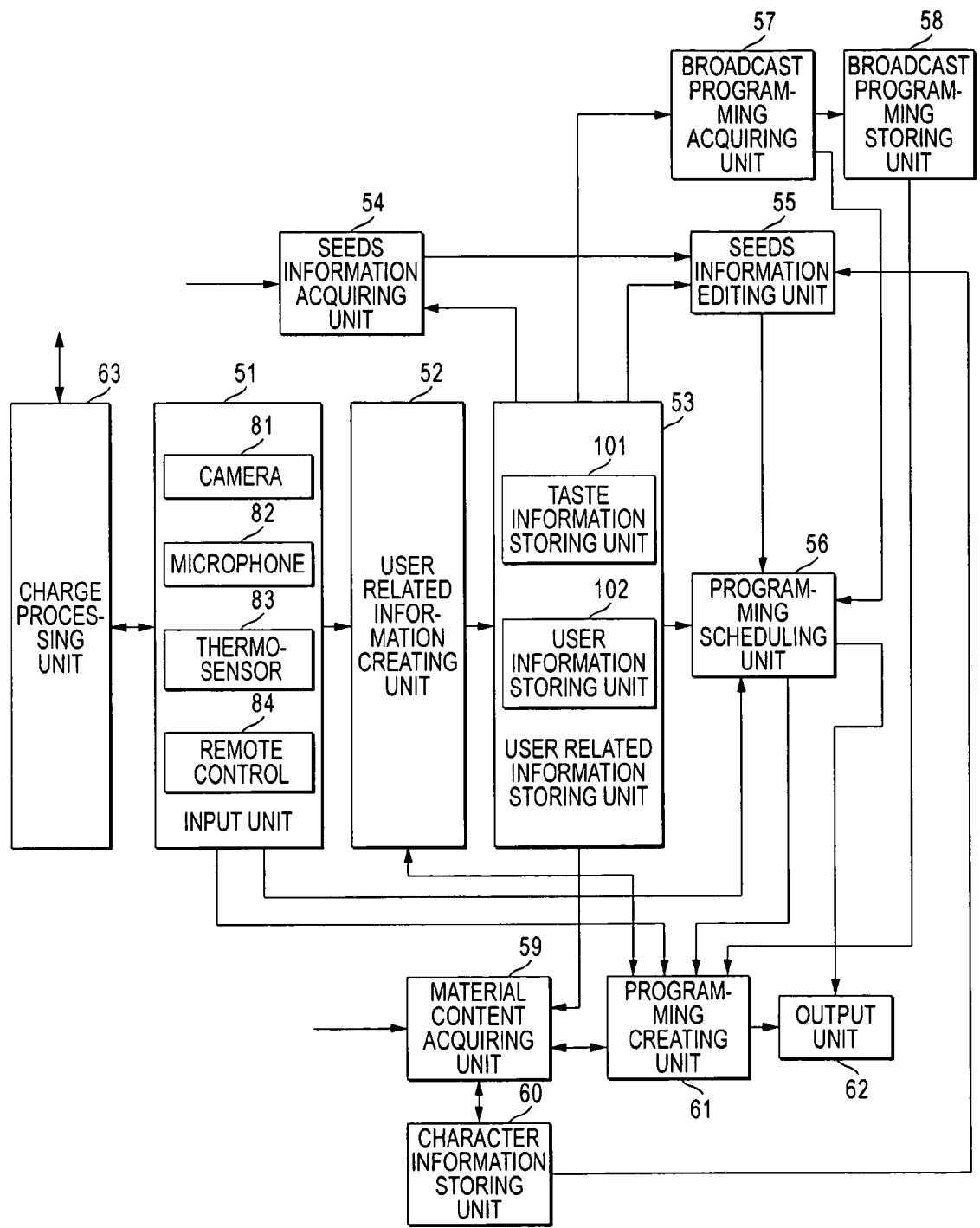
FIG. 3 shows a block diagram illustrating an exemplary functional configuration of the programming creation apparatus shown in FIG. 2.

An information processing apparatus according to an embodiment of the invention is an information processing apparatus (for example, a programming creation apparatus 13 shown in FIG. 1) which creates a predetermined piece of programming including: a taste information acquiring module which acquires taste information showing user's tastes (for example, a taste information storing unit 101 shown in FIG. 3); a material information acquiring module which acquires a component configuring the piece of programming as material information (for example, a material content acquiring unit 59 shown in FIG. 3); a construction information acquiring module which acquires construction information that describes a construction of the piece of programming and includes a motion of the component in the piece of programming (for example, a seeds information acquiring unit 54 shown in FIG. 3); and a creating module which creates the piece of programming based on the taste information, the material information, and the construction information (for example, a programming creating unit 61 shown in FIG. 3).

Figure 18:
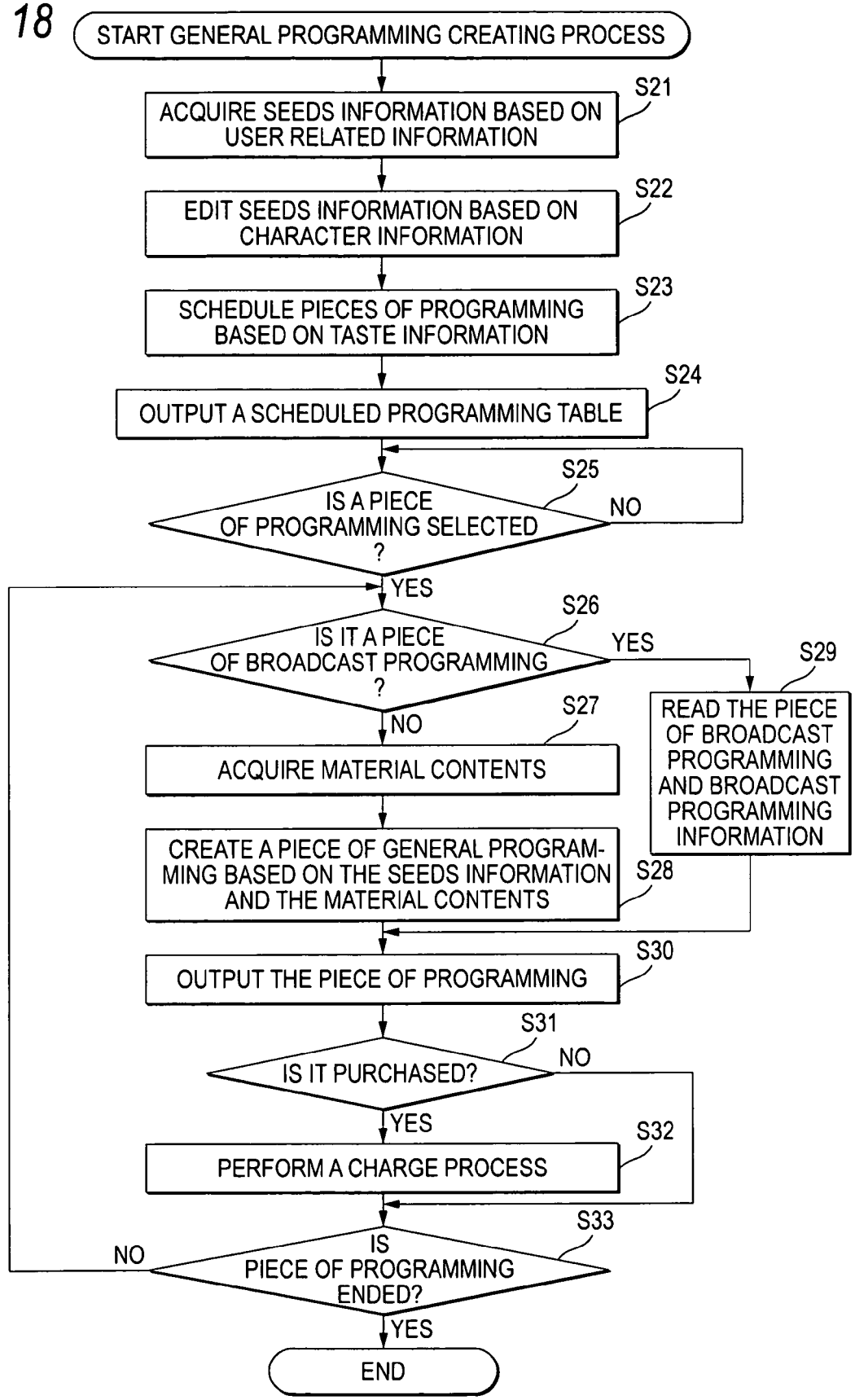
FIG. 18 shows a flow chart illustrative of a general programming creating process done by the programming creation apparatus.

An information processing apparatus according to an embodiment of the invention is the information processing apparatus wherein the construction information acquiring module acquires the construction information based on the taste information (for example, a process step at Step S21 shown in FIG. 18).

An information processing apparatus according to an embodiment of the invention is the information processing apparatus wherein the material information acquiring module acquires the material information based on the taste information (for example, a process step at Step S27 shown in FIG. 18).

An information processing apparatus according to an embodiment of the invention is the information processing apparatus further including a creating module which creates the taste information based on input information inputted by a user while the piece of programming is being watched (for example, a user related information creating unit 52 shown in FIG. 3), wherein the taste information acquiring module acquires taste information created at the creating module (for example, a process step at Step S3 shown in FIG. 16); and the creating module creates the piece of programming based on taste information created in accordance with input information inputted by the user who is watching the piece of programming, the material information, and the construction information, while the piece of programming is being created (for example, a process step at Step S28 shown in FIG. 18).

An information processing apparatus according to an embodiment of the invention is the information processing apparatus wherein the construction information acquiring module further edits the construction information based on the taste information (for example, a process step at Step S22 shown in FIG. 18); and the creating module creates the piece of programming based on the taste information, the material information, and construction information edited at the construction information acquiring module (for example, a process step at Step S28 shown in FIG. 18).

An information processing method according to an embodiment of the invention is an information processing method of an information processing apparatus (for example, the programming creation apparatus 13 shown in FIG. 1) which creates a predetermined piece of programming including: a taste information acquiring step which acquires taste information showing user's tastes (for example, Step S3 shown in FIG. 16); a material information acquiring step which acquires a component configuring a piece of programming as material information (for example, Step S27 shown in FIG. 18); a construction information acquiring step which acquires construction information that describes a construction of the piece of programming and includes a motion of the component in the piece of programming (for example, Step S21 shown in FIG. 18); and a creating step which creates the piece of programming based on the taste information, the material information, and the construction information (for example, Step S28 shown in FIG. 18).

A program according to an embodiment of the invention is a program which allows a computer to execute a process that creates a predetermined piece of programming including: a taste information acquiring step which acquires taste information showing user's tastes (for example, Step S3 shown in FIG. 16); a material information acquiring step which acquires a component configuring a piece of programming as material information (for example, Step S27 shown in FIG. 18); a construction information acquiring step which acquires construction information that describes a construction of the piece of programming and includes a motion of the component in the piece of programming (for example, Step S21 shown in FIG. 18); and a creating step which creates the piece of programming based on the taste information, the material information, and the construction information (for example, Step S28 shown in FIG. 18).

Hereinafter, a specific embodiment to which an embodiment of the invention is adapted will be described in detail with reference to the drawings.

Figure 1:
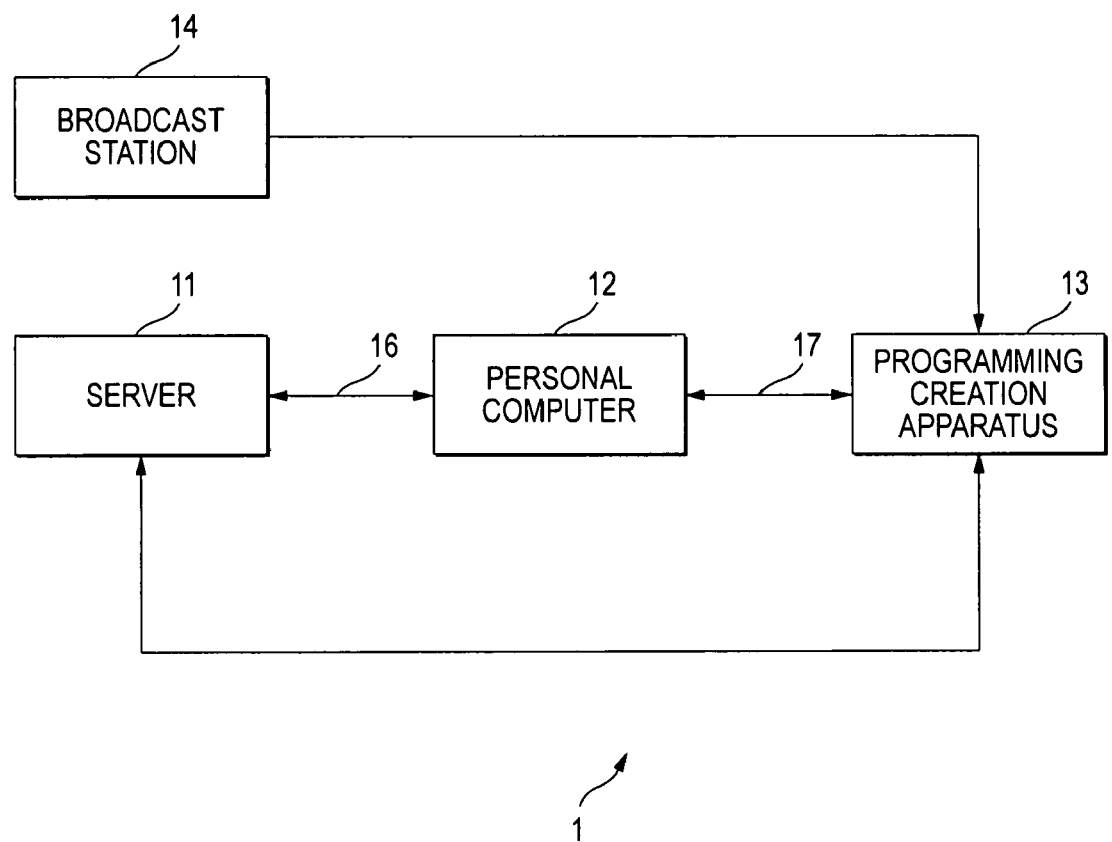
FIG. 1 shows a block diagram illustrating an exemplary configuration of a programming creation system to which an embodiment of the invention is adapted.

FIG. 1 is a block diagram illustrating an exemplary configuration of a programming creation system 1 to which an embodiment of the invention is adapted.

The programming creation system 1 shown in FIG. 1 is configured to have a server 11, a personal computer (hereinafter, called PC) 12, a programming creation apparatus 13, a broadcast station 14, and networks 15 to 17.

The server 11 is connected to the programming creation apparatus 13 through the network 15 such as the Internet. In addition, the server 11 is connected to the PC 12 through the network 16 such as the Internet. The server 11 stores seeds information 130 which describes contents and the construction of pieces of programming to create (scenarios) (described later in FIG. 5).

In response to a request from the programming creation apparatus 13, to the programming creation apparatus 13, the server 11 sends components of pieces of programming to be created by the programming creation apparatus 13 (for example, contents such as people, objects, backgrounds, BGM (background music), songs and information) as material contents among the contents stored therein. In addition, in response to a request from the programming creation apparatus 13, the server 11 sends seeds information 130 to the programming creation apparatus 13.

The PC 12 is connected to the programming creation apparatus 13 through the network 17 such as a home network. In response to a request supplied from the programming creation apparatus 13 through the network 17, the PC 12 sends that request to the server 11 through the network 16. In addition, the PC 12 stores the contents and the seeds information 130 therein.

Furthermore, in response to a request supplied from the programming creation apparatus 13 through the network 17, the PC 12 sends the material contents sent from the server 11 to the programming creation apparatus 13, or sends the components of a piece of programming to create as the material contents to the programming creation apparatus 13 among the contents stored therein. In addition, in response to a request from the programming creation apparatus 13, to the programming creation apparatus 13, the PC 12 sends the seeds information 130 sent from the server 11, or the seeds information 130 stored therein.

Based on the seeds information 130 and the material contents sent from the server 11 or the PC 12 and based on taste information which represents user's tastes, the programming creation apparatus 13 creates (the contents of) a piece of programming to create. In addition, the programming creation apparatus 13 receives and records a predetermined piece of broadcast programming from the broadcast station 14 based on broadcast programming information such as an EPG (Electronic Program Guide) supplied from the broadcast station 14 and taste information. The broadcast station 14 creates a piece of broadcast programming and broadcast programming information, and sends them to the programming creation apparatus 13.

In addition, hereinafter, when it is unnecessary to distinguish a piece of broadcast programming from a piece of programming to create, they are all called a piece of programming.

Figure 2:
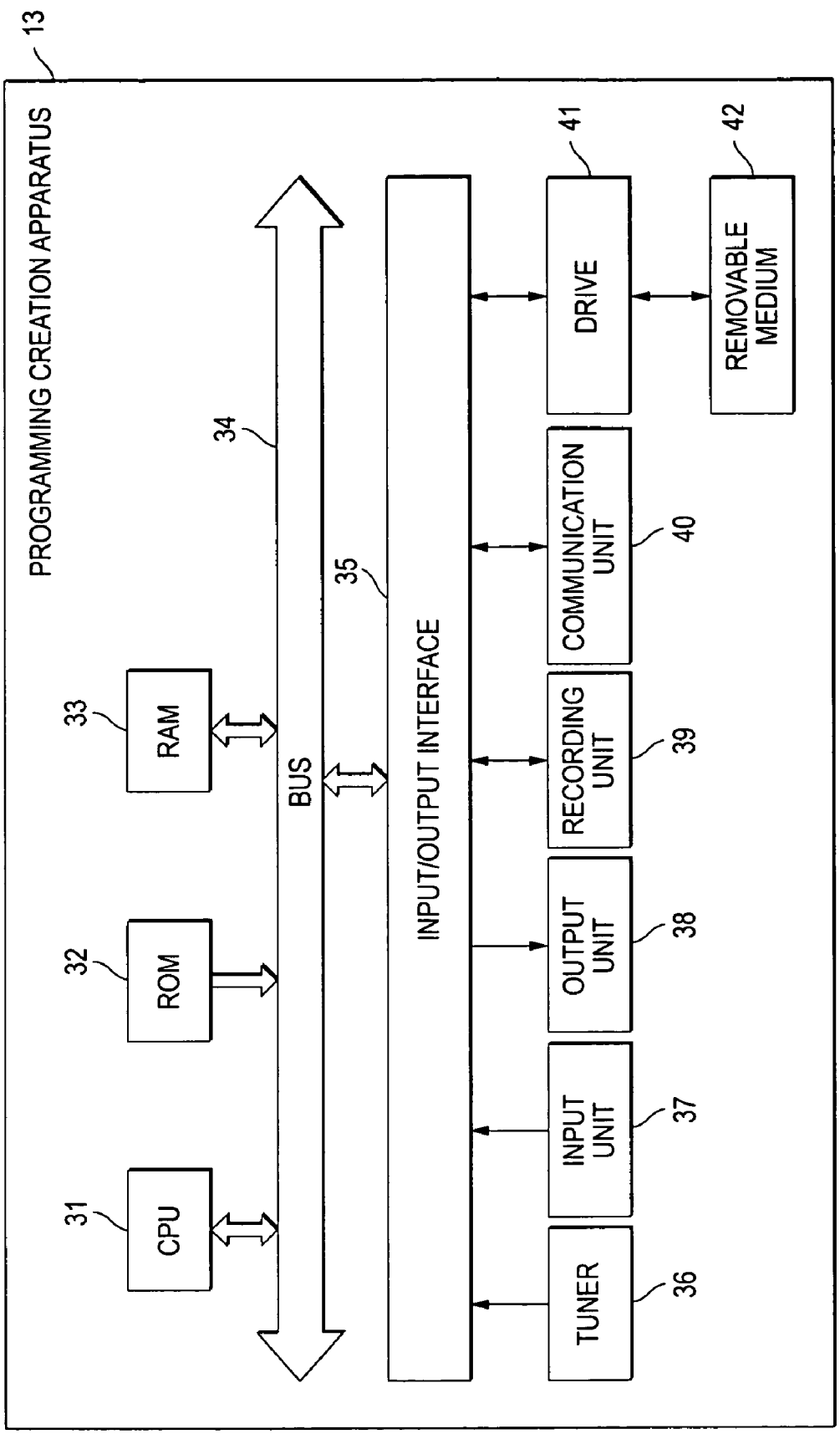
FIG. 2 shows a block diagram illustrating an exemplary hardware configuration of a programming creation apparatus shown in FIG. 1.

FIG. 2 is a block diagram illustrating an exemplary hardware configuration of the programming creation apparatus 13 shown in FIG. 1.

As shown in FIG. 2, a CPU (Central Processing Unit) 31 is connected to ROM (Read Only Memory) 32 and RAM (Random Access Memory) 33 through a bus 34. The CPU 31 executes various processes in accordance with programs stored in the ROM 32, or programs stored in a recording unit 39. The RAM 33 properly stores programs and data executed by the CPU 31 therein.

An input/output interface 35 is also connected to the CPU 31 through the bus 34. To the input/output interface 35, connected are a tuner 36, an input unit 37 formed of a keyboard, a mouse, a remote control, etc., and an output unit 38 formed of an LCD (Liquid Crystal Display) or CRT (Cathode Ray Tube) display. The tuner 36 receives apiece of broadcast programming and broadcast programming information from the broadcast station 14 shown in FIG. 1 through an antenna, not shown. The CPU 31 executes various processes in response to an instruction inputted from the input unit 37. Then, to output unit 38, the CPU 31 outputs images and sounds resulting from processing.

The recording unit 39 connected to the input/output interface 35 is configured to have a hard disk, for example, and records programs executed by the CPU 31 and various items of data. A communication unit 40 communicates with the server 11 or the PC 12 through the network 15 or 17, for example.

In addition, a program may be acquired through the communication unit 40 and recorded in the recording unit 39.

A drive 41 connected to the input/output interface 35 drives a removable medium 42 such as a magnetic disc, an optical disc, a magneto-optical disc, or a semiconductor memory when it is mounted, and acquires a program and data recorded thereon. The acquired program and data is forwarded to the recording unit 39 and recorded thereon as necessary.

In addition, the server 11 and the PC 12 shown in FIG. 1 are configured as similar to the programming creation apparatus 13 shown in FIG. 2, omitting the description. Moreover, the server 11 and the PC 12 may not have the tuner 36.

FIG. 3 is a block diagram illustrating an exemplary functional configuration of the programming creation apparatus 13 shown in FIG. 2.

In addition, for the convenience of explanation, it is considered that the programming creation apparatus 13 shown in FIG. 3 acquires seeds information 130 and material contents from the server 11.

The programming creation apparatus 13 shown in FIG. 3 is configured to have an input unit 51, a user related information creating unit 52, a user related information storing unit 53, a seeds information acquiring unit 54, a seeds information editing unit 55, a programming scheduling unit 56, a broadcast programming acquiring unit 57, a broadcast programming storing unit 58, a material content acquiring unit 59, a character information storing unit 60, a programming creating unit 61, an output unit 62, and a charge processing unit 63.

The input unit 51 is configured to have a camera 81, a microphone 82, a thermosensor 83, and a remote control 84. The camera 81 shoots a user, for example, to acquire image data such as the user's eyes, face and body. The microphone 82 acquires surrounding sounds to obtain sound data. The thermosensor 83 measures the user's body temperature to acquire user's body temperature data. The remote control 84 accepts an operation from a user to acquire operation data corresponding to that operation.

The input unit 51 supplies image data, sound data, body temperature data, or operation data as input information to the user related information creating unit 52. In addition, the input unit 51 supplies operation data to the programming scheduling unit 56 and the programming creating unit 61 as necessary. Furthermore, the input unit 51 supplies operation data or sound data to the charge processing unit 63 as necessary.

The user related information creating unit 52 creates taste information based on input information from the input unit 81 and on keywords (for example, a title, a genre, a person's name that appears in the programming and so on) about a piece of programming that is now being outputted from the output unit 62 (that is being watched by a user) and supplied from the programming creating unit 61.

For example, when a user operates the remote control 84 to specify a piece of programming that is a subject to be watched by the user, the remote control 84 supplies operation data corresponding to that operation as input information to the user related information creating unit 52. At this time, to the user related information creating unit 52, a person's name that appears in the programming in the piece of programming, for example, is supplied as a keyword about the piece of programming that is being watched by the user, that is, the piece of programming that is specified by the user as a subject to watch. The user related information creating unit 52 decides the degree of tastes that indicates the degree of user's tastes with respect to a person who appears in the programming based on that person's name that appears in the programming and on input information supplied from the input unit 51 while the user is watching the piece of programming. Then, the user related information creating unit 52 creates information that the person's name that appears in the programming is associated with the corresponding degree of tastes as taste information.

In addition, the user related information creating unit 52 creates user information which is user's information such as user's residence, residential area and age based on sound data or operation data. More specifically, the user inputs information about his/her residence, residential area, and age by speaking information or by using the remote control 84. The user related information creating unit 52 creates user information based on sound data corresponding to that speech, or operation data corresponding to that input (input operation) The user related information creating unit 52 supplies taste information and user information as user related information to the user related information storing unit 53.

The user related information storing unit 53 is configured to have a taste information storing unit 101 and a user information storing unit 102. The taste information storing unit 101 stores taste information from the user related information creating unit 52. The user information storing unit 102 stores user information from the user related information creating unit 52.

The user related information storing unit 53 supplies user related information stored in the taste information storing unit 101 and the user information storing unit 102 to the seeds information acquiring unit 54, the broadcast programming acquiring unit 57, and the material content acquiring unit 59. In addition, the user related information storing unit 53 supplies taste information stored in the taste information storing unit 101 to the seeds information editing unit 55 and the programming scheduling unit 56.

The seeds information acquiring unit 54 acquires seeds information 130 from the server 11 based on the user related information from the user related information storing unit 53, and supplies it to the seeds information editing unit 55. For example, the seeds information acquiring unit 54 acquires seeds information 130 about a piece of programming to create that a user likes and can watch by that user's age based on user related information, and supplies it to the seeds information editing unit 55.

The seeds information editing unit 55 reads character information that is information about a person such as gender, height, weight, hair length, age and so on out of the character information storing unit 60 as necessary. In addition, the seeds information editing unit 55 edits seeds information 130 based on the character information, the seeds information 130 from the seeds information acquiring unit 54, and the taste information from the user related information storing unit 53, and supplies the seeds information 130 after edited to the programming scheduling unit 56.

The programming scheduling unit 56 schedules the piece of programming based on the seeds information 130 from the seeds information editing unit 55, the broadcast programming information supplied from the broadcast programming acquiring unit 57, and the taste information from the user related information storing unit 102.

Figure 4:
FIG. 4 shows a diagram illustrating an exemplary scheduled programming table.

More specifically, the programming scheduling unit 56 schedules (arranges) a piece of programming to create corresponding to the seeds information 130 and a piece of broadcast programming corresponding to the broadcast programming information based on the user taste information, and creates a scheduled programming table 120 which shows the schedule of the piece of programming to create and the piece of broadcast programming (FIG. 4 described later). Then, the programming scheduling unit 56 supplies the scheduled programming table 120 and the seeds information 130 to the programming creating unit 61. In addition, the programming scheduling unit 56 allows the output unit 62 to display the scheduled programming table 120 in accordance with the operation data from the input unit 51.

The broadcast programming acquiring unit 57 acquires broadcast programming information from the broadcast station 14 through the tuner 36 (FIG. 2). The broadcast programming acquiring unit 57 acquires the piece of broadcast programming that a user likes and can watch by that user's age, for example, based on broadcast programming information and user related information from the user related information storing unit 53, and supplies the piece of broadcast programming and the broadcast programming information to the broadcast programming storing unit 58. The broadcast programming acquiring unit 57 reads the broadcast programming information out of the broadcast programming storing unit 58, and supplies it to the programming scheduling unit 56.

The broadcast programming storing unit 58 stores the piece of broadcast programming and the broadcast programming information from the broadcast programming acquiring unit 57. The material content acquiring unit 59 acquires person related information that is information about a person such as gender, height, weight, hair length, and age from the server 11 based on taste information of user related information from the user related information storing unit 53. The material content acquiring unit 59 creates character information formed of a person's name and person related information corresponding thereto, and supplies it to the character information storing unit 60.

In addition, the material content acquiring unit 59 acquires material contents from the server 11 based on the user related information from the user related information storing unit 53 or the character information stored in the character information storing unit 60 and on the seeds information 130 from the programming creating unit 61, and supplies them to the programming creating unit 61.

More specifically, the material content acquiring unit 59 stores the contents of images and sounds of a predetermined person and object as master data in a storing unit (not shown) incorporated therein. The material content acquiring unit 59 uses metadata of contents (for example, such as RSS (Rich Site Summary) information) stored in the server 11 to acquire the contents that are considered to match with component information 132 of the seeds information 130 (for example, "a woman with longhair", "four passenger automobile" and soon), and compares them with master data. The material content acquiring unit 59 acquires the contents that match with master data (that have a high degree of matching) as material contents, and accumulates the contents as master data.

The character information storing unit 60 stores character information from the material content acquiring unit 59. In addition, the character information storing unit 60 supplies character information already stored therein to the material content acquiring unit 59.

The programming creating unit 61 decides a piece of programming to be a subject to watch based on the scheduled programming table 120 from the programming scheduling unit 56 and the operation data from the input unit 51. When a piece of programming to be a subject to watch is a piece of broadcast programming, the programming creating unit 61 reads that piece of broadcast programming out of the broadcast programming storing unit 58, and supplies it to the output unit 62.

On the other hand, when a piece of programming to be a subject to watch is a piece of programming to create, the programming creating unit 61 supplies the seeds information 130 about that piece of programming to create to the material content acquiring unit 59. The programming creating unit 61 creates a piece of programming to create based on the material contents and the seeds information 130 supplied from the material content acquiring unit 59, and supplies it to the output unit 62. In addition, the programming creating unit 61 supplies a keyword related to a piece of programming to be a subject to watch to the user related information creating unit 52.

The output unit 62 outputs the scheduled programming table 120 from the programming scheduling unit 56, or the piece of programming from the programming creating unit 61. More specifically, the output unit 62 displays an image corresponding to the scheduled programming table 120 or the piece of programming, as well as makes sounds corresponding to the scheduled programming table 120 or the piece of programming.

The charge processing unit 63 communicates with the server 11 in accordance with the operation data or sound data corresponding to an instruction of buying a product (the purchase operation) supplied from the input unit 51, and thus it performs a charge process for that merchandise. Consequently, a user can buy a predetermined product.

Next, the scheduled programming table 120 created by the programming scheduling unit 56 shown in FIG. 3 will be described with reference to FIG. 4.

The scheduled programming table 120 shown in FIG. 4 is a table of scheduled pieces of programming resulting from scheduling pieces of programming based on taste information by the programming scheduling unit 56, including programming names such as "Yuki Sato's five minute news", "Happy Friends", "Soccer World Cup", "The current music chart top 30", "A×Z", "Yumi Suzuki's shopping!", "Kijitaku's news comments", "Super teacher story" and so on, and also including genres and types of programming for the pieces of programming such as "Yuki Sato's five minute news", "Happy Friends", "Soccer World Cup", "The current music chart top 30", "A×Z", "Yumi Suzuki's shopping!", "Kijitaku's news comments", "Super teacher story" and so on.

In addition, hereinafter, the piece of programming having a programming name of "AAA" is called the programming "AAA". In addition, in FIG. 4, the degree of tastes for the genre represented by taste information is considered to be higher in order of "news", "drama", "sports", "music", "variety", and "shopping".

As shown in FIG. 4, for the programming "Yuki Sato's five minute news", "news" is registered as the genre of that piece of programming. In addition, for the type of programming, "create" is registered that represents the piece of programming to create.

In addition, for the programming "Happy Friends", "drama" is registered as the genre, and "create" is registered as the type of programming. For the programming "Soccer World Cup", "sports" is registered as the genre, and for the type of programming, "broadcast" is registered that represents the broadcast programming.

Furthermore, for the programming "The current music chart top 30", "music" is registered as the genre, and "create" is registered as the type of programming. For the programming "A×Z", "variety" is registered as the genre, and "broadcast" is registered as the type of programming.

In addition, for the programming "Yumi Suzuki's shopping!", "shopping" is registered as the genre, and "create" is registered as the type of programming. For the programming "Kijitaku's news comments", "news" is registered as the genre, and "create" is registered as the type of programming. Furthermore, for the programming "Super teacher story", "drama" is registered as the genre, and "create" is registered as the type of programming.

As described above, in the scheduled programming table 120 shown in FIG. 4, pieces of programming are repeatedly arranged on the genre in order of "news", "drama", "sports", "music", "variety", and "shopping" based on the degree of tastes for the genre represented by taste information.

The user operates the remote control 84, for example, to move a cursor on the programming name of a desired programming while watching the scheduled programming table 120 displayed on the output unit 62 (FIG. 3), and thus the user specifies a piece of programming to be a subject to watch.

In addition, in FIG. 4, the pieces of programming are scheduled based on the degree of tastes for the genre represented by taste information, but pieces of programming maybe scheduled so as to arrange them in descending order of the degree of tastes based on the degree of tastes for keywords other than the genre (for example, actors, actresses and so on).

In addition, hereinafter, for the convenience of explanation, the pieces of programming to create having the genre of "news", "drama", "sports", "music", "variety", and "shopping" are also called pieces of general programming. In addition, the piece of programming having a genre of "AAA" is also called the programming AAA. For example, the piece of programming having the genre of "news" is also called the news programming.

Figure 5:
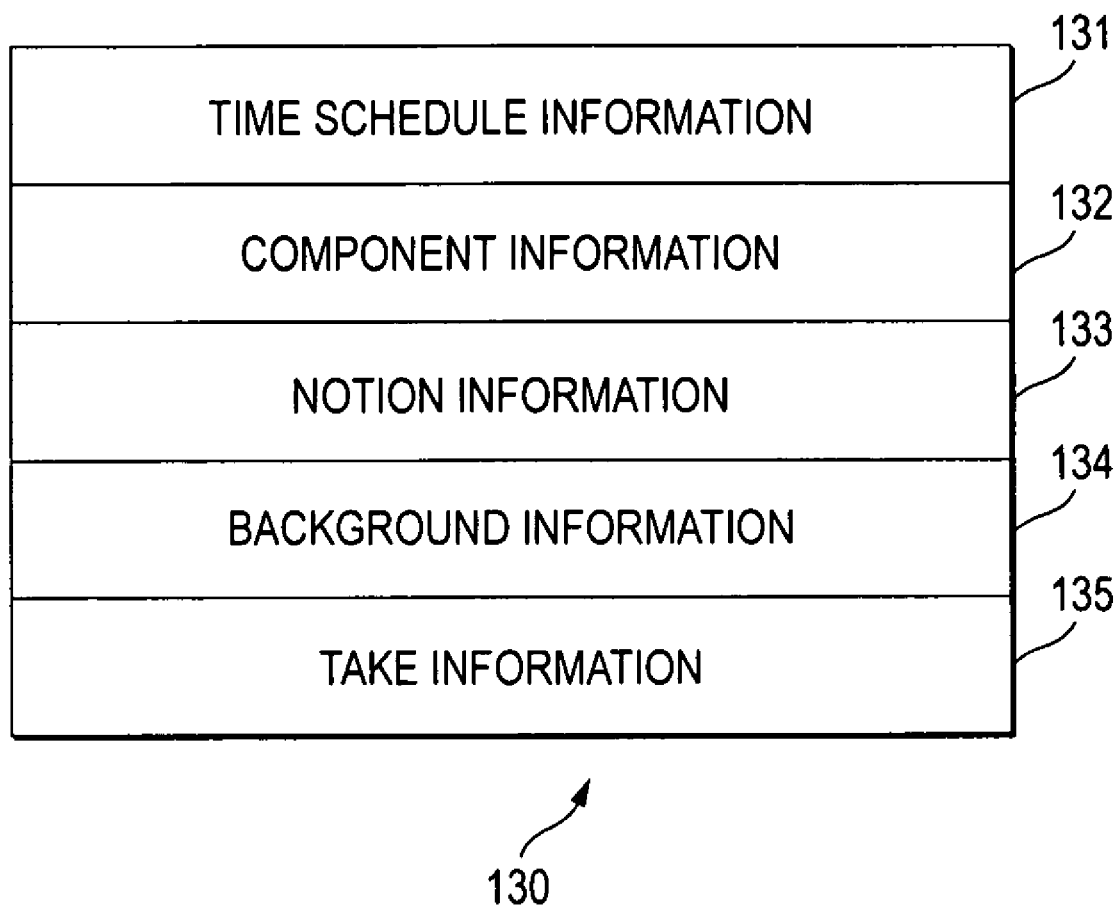
FIG. 5 shows a diagram illustrating exemplary seeds information.

FIG. 5 shows exemplary seeds information 130.

The seeds information 130 shown in FIG. 5 is configured to have time schedule information 131, component information 132, motion information 133, background information 134, and take information 135.

The time schedule information 131 is information about a time schedule that represents a relative point in time in a piece of programming and the motion (action) of a component at that point in time.

The component information 132 is information about the shape, sound quality and so on of a component other than the contents of the backgrounds of the piece of programming to create (for example, the contents such as background images, and BGM). The motion information 133 is information about positions to display individual components, and positions to speak dialogues by people and objects corresponding to the individual components (a point in time for speech). The background information 134 is information about the contents of a background to be a component. The take information 134 is information about shooting conditions such as shooting directions, the intensity when shooting, shooting points in time, and locations to shoot for a piece of programming to create.

The material content acquiring unit 59 acquires the contents matched with the shooting condition of the take information 134 as material contents among the contents matched with the shape, sound quality and so on of the component information 132. In addition, the material content acquiring unit 59 acquires the contents of a background as the material contents based on the background information 134.

FIG. 6 shows exemplary time schedule information 131 about the programming "Yuki Sato's five minute news" that is a piece of news programming of the general programming (FIG. 5). In addition, in FIG. 6, a numeral at the head and a colon in each line are added for the convenience of explanation which are the same in FIGS. 9, 11, 13, and 24 described later.

"Title: [Caster's] five minute news" at the first line in the time schedule information 131 shown in FIG. 6 shows that the programming name (the title) is "[Caster's] five minute news". [Caster] is a variable that represents a person's name decided as a caster by the seeds information editing unit 55, and that person's name is set to [Caster].

More specifically, in the component information 132 of the programming "Yuki Sato's five minute news", information is described that is about the shape of the caster contents to be the component of the piece of programming (for example, height, weight and so on) and sound quality. The seeds information editing unit 55 decided a person who corresponds to person related information matched with the component information 132 as the caster based on character information stored in the character information storing unit 60. In FIG. 6, the seeds information editing unit 55 decides "Yuki Sato" as the caster, and sets "Yuki Sato" to [Caster].

"Genre: news" at the second line shows that the genre of the programming "Yuki Sato's five minute news" is news, and "length: 5 min." at the third line shows that the length (time period) of the programming "Yuki Sato's five minute news" is five minutes.

"Construction" at the fourth line shows that the lines below the fourth line are the construction of the programming "Yuki Sato's five minute news". "News column" at the fifth line shows that the construction of "news column" is described after the fifth line. "Headline" at the sixth line shows that the construction of "headline" is described after the sixth line. "Length: 10 sec." at the seventh line shows that the time period for "headline" is ten seconds.

"Contents: from a news Web site, acquire information about ten items of major news plus three items of minor news based on taste information and display the headline" at the eight to tenth lines show that the contents of "headline" are created so that the list of news is displayed as the material contents are news information to be the contents for ten items of major (main) news and three items of minor news based on taste information among items of news which are stored in the server 11 and opened at a news WEB (World Wide Web) site.

"Read news" at the eleventh line shows that the construction of "read news" is described after the eleventh line, and "length: 3 min. 50 sec." at the twelfth line shows that the time period for "read news" is three minutes fifty seconds.

"Contents: acquire detailed information about each item of news displayed at the headline and the caster's person information and read the detail of the news by the caster while displaying detailed information about news" at the thirteenth to fourteenth lines show that the contents of "read news" are created so that "Yuki Sato" reads the detailed information about news while displaying the list of the detailed information of news displayed as the headline, as the material contents are news information and person information to be the contents such as person's images and sounds of "Yuki Sato" to be the caster.

In addition, "weather forecast column" at the fifteenth line shows that the construction of "weather forecast column is described after the fifteenth line, and "weather map" at the sixteenth line shows that the lines after the sixteenth line are the construction of "weather map".

"Length: 10 sec." at the seventeenth line shows that the time period for "weather map" is ten seconds. "Contents: acquire a nationwide weather map from a weather forecast Web site and display it and give comments by the caster" at the eighteenth line show that the contents of "weather map" are created so that "Yuki Sato" comments on a nationwide weather map while displaying that nationwide weather map as the material contents are weather map information to be the contents of the nationwide weather map opened on the weather forecast Web site and person information about "Yuki Sato", which are stored in the server 11.

"Weather forecast" at the nineteenth line shows that the construction of "weather forecast" is described after the nineteenth line, and "length: 40 sec." at the twentieth line shows that the time period for "weather forecast" is forty seconds. "Contents: acquire a weather forecast, temperature, and a chance of precipitation in the user residential area from a weather forecast Web site and display them and read them by the caster" at the twenty-first to twenty-second lines show that the contents of "weather forecast" are created so that "Yuki Sato" reads a weather forecast while displaying the weather forecast as the material contents are weather forecast information formed of the contents showing the weather forecast configured of the weather forecast, humidity, and the chance of precipitation in the user residential area which are opened at a weather forecast Web site, and person information about "Yuki Sato", which are stored in the server 11.

"Pollen information" at the twenty-third line shows that the construction of "pollen information" is described after the twenty-third line, and "length: 10 sec." at the twenty-fourth line shows that the time period for "pollen information" is ten seconds. "Contents: acquire pollen drift information about the user residential area from a pollen information Web site and display it and read it by the caster" at the twenty-fifth and twenty-sixth lines show that the contents of "Pollen information" are created so that "Yuki Sato" reads the pollen drift state while displaying the pollen drift state as the material contents are pollen drift information to be the contents showing the pollen drift state in the user residential area which is opened at a Web site of pollen information and person information about "Yuki Sato", which are stored in the server 11.

As described above, the programming "Yuki Sato's five minute news" is configured of "news column" for four minutes which is constructed of "headline" for ten seconds and "read news" for three minutes fifty seconds, and of "weather forecast column" for one minute which is constructed of "weather map" for ten seconds, "weather forecast" for forty seconds, and "pollen information" for ten seconds.

Figure 7:
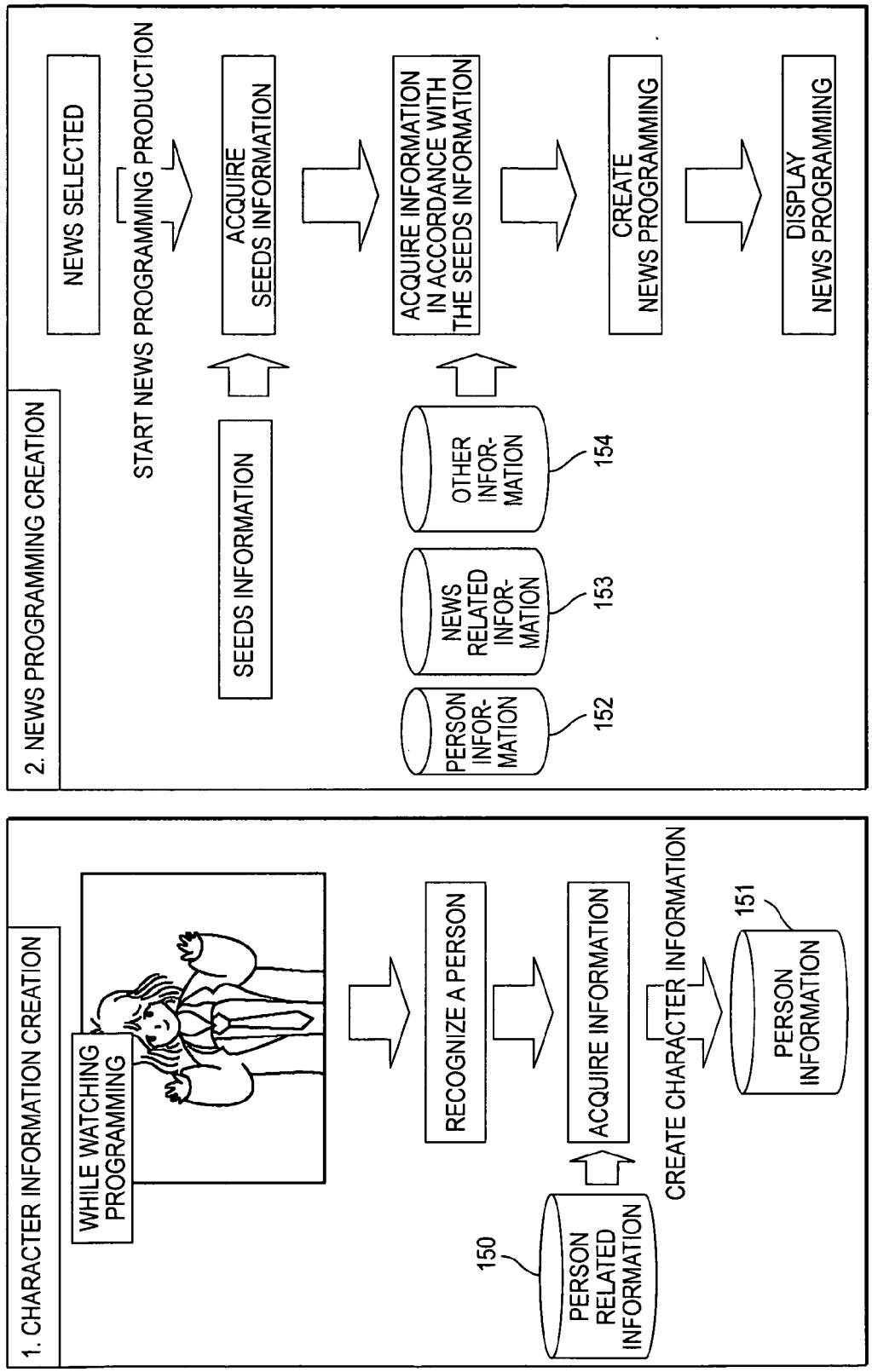
FIG. 7 shows a diagram illustrative of a method of creating a piece of news programming.

Next, a method of creating the programming "Yuki Sato's five minute news" will be described with reference to FIG. 7.

First, when a user operates the remote control 84 to specify a piece of programming to be a subject to watch while watching the scheduled programming table 120 (FIG. 4) displayed on the output unit 62, the input unit 51 supplies operation data corresponding to that operation as input information to the user related information creating unit 52. The user related information creating unit 52 creates taste information based on the input information from the user related information creating unit 52 and on the keywords for the piece of programming to be a subject to watch supplied from the programming creating unit 61, and stores it in the taste information storing unit 101.

For example, when "Yuki Sato" appears in the piece of programming to be a subject to watch, the programming creating unit 61 supplies "Yuki Sato" as a keyword, which is a person's name that appears in the programming, to the user related information creating unit 52. The user related information creating unit 52 decides the degree of tastes for "Yuki Sato", and supplies "Yuki Sato" and the corresponding degree of tastes as the taste information to the taste information storing unit 101.

Subsequently, the material content acquiring unit 59 acquires the person name of the keyword from taste information stored in the taste information storing unit 101, and thus recognizes the person who the user likes. Then, the material content acquiring unit 59 acquires person related information 150 about that person from the server 11, creates character information 151 formed of the person name and the person related information 150 corresponding thereto, and stores it in the character information storing unit 60.

For example, the material content acquiring unit 59 stores the character information 151 formed of "Yuki Sato" and the person related information 150 about "Yuki Sato" in the character information storing unit 60.

Subsequently, when the user specifies (selects) the programming "Yuki Sato's five minute news" as the piece of programming to be a subject to watch, the programming creating unit 61 supplies the seeds information 130 shown in FIG. 6 to the material content acquiring unit 59. The material content acquiring unit 59 acquires material contents from the server 11 based on the taste information and the seeds information 130.

More specifically, the material content acquiring unit 59 acquires the material contents which are person information 152 about "Yuki Sato" which is decided as a caster based on seeds information 130, and supplies it to the programming creating unit 61. In addition, the material content acquiring unit 59 acquires the material contents which are news related information 153 formed of news information, weather map information, weather forecast information, or pollen drift information, and other information 154 to be the components other than the person information 152 and the news related information 153 (for example, the contents of backgrounds) based on the taste information and the seeds information 130, and supplies them to the programming creating unit 61.

In addition, the material content acquiring unit 59 may summarize, analyze, or translate information corresponding to the acquired contents and then supply the material contents which are the contents corresponding to information after summarized, analyzed, or translated to the programming creating unit 61, not supply the acquired contents as they are to the programming creating unit 61.

For example, the material content acquiring unit 59 may acquire and analyze information about public opinion with respect to news, and may supply the contents showing information about public opinion after analyzed as the material contents to the programming creating unit 61.

The programming creating unit 61 creates the programming "Yuki Sato's five minute news" to be news based on the material contents from the material content acquiring unit 59 and the seeds information 130, and outputs it to the output unit 62.

Next, the programming "Yuki Sato's five minute news" outputted from the output unit 62 will be described with reference to FIG. 8.

For example, in FIG. 8, the material content acquiring unit 59 acquires the material contents which are the person information 152 about "Yuki Sato", the news related information 153 including the contents of three items of minor news related to "economy", and the other information 154, and supplies them to the programming creating unit 61.

The programming creating unit 61 performs CG (Computer Graphics) processing using a polygon, for example, based on the time schedule information 131 (FIG. 6) and the person information 152 about "Yuki Sato", and creates caster contents which are the contents of "Yuki Sato" reading detailed information about three items of minor news related to "economy".

In addition, the programming creating unit 61 creates news contents which are the contents for showing the list of the detailed information about each of three items of news based on the news related information 153. The programming creating unit 61 combines the caster contents, the news contents, and the other information 154 based on motion information 133, and supplies it as the programming "Yuki Sato's five minute news" to the output unit 62.

Consequently, as shown in FIG. 8, in the programming "Yuki Sato's five minute news" to be outputted to the output unit 62, the list of detailed information about news is displayed, and the detailed information is read by "Yuki Sato".

FIG. 9 shows exemplary time schedule information 131 about the programming "Happy Friends" that is a piece of drama programming of the piece of general programming (FIG. 5).

"Title: Happy Friends" at the first line in time schedule information 131 shown in FIG. 9 shows that the programming name is "Happy Friends". "Genre: drama (love story)" at the second line shows that the genre of the programming "Happy Friends" is drama, and that the programming "Happy Friends" is a love story. "Length: 50 min." at the third line shows that the time period for the programming "Happy Friends" is fifty minutes.

"Construction" at the fourth line shows that the construction of the piece of programming is described after the fourth line, and "cast information" at the fifth line shows that "cast information" is described after the fifth line. "Character A: name, gender, age, occupation, looks, personality and so on" at the sixth line and "character B: name, gender, age, occupation, looks, personality and so on" at the seventh line show that character A or B's name, gender, age, occupation, looks, personality and so on, the character is a role appearing in the programming "Happy Friends".

Here, the component information 132 of the programming "Happy Friends" includes information corresponding to "cast information". More specifically, the component information 132 includes information about gender, age, looks and so on of characters A and B.

"Scene 1:" at the eighth line shows that the construction of "scene 1" is described after the eighth line, and "length: 30 sec." at the ninth line shows that the time period for "scene 1" is thirty minutes.

"Location: XXX (given letters)" at the tenth line, "Time: XXX" at the eleventh line, and "Action: XXX" at the twelfth line, and "Dialogue: XXX" at the thirteenth line show the location, time, action, and dialogue in "scene 1", respectively.

"Select 1" at the fourteenth line shows that the descriptions of "select1" are described after the fourteenth line. "Move to scene 2, if taste information is XXX, or move to scene 10, if taste information is other than XXX" at the fifteenth line shows that it is decided depending on taste information whether to move to "scene 2" or to "scene 10" after "scene 1".

"Scene 2" at the sixteenth line shows that the construction of "scene 2" is described after the sixteenth line. After the sixteenth line, the construction of "scene 2" is described as similar to scene 1.

In addition, in the example shown in FIG. 9, the scene to move is changed depending on taste information as "select 1", but the appearance, fashion, stuff to carry and so on of character A or B may be changed.

Next, the programming "Happy Friends" outputted to the output unit 62 will be described with reference to FIG. 10.

When a user specifies the programming "Happy Friends" as a piece of programming to be a subject to watch, the programming creating unit 61 supplies the seeds information 130 (FIG. 9) of the programming "Happy Friends" to the material content acquiring unit 59.

The material content acquiring unit 59 determines a person as character A or B, the person who is matched with information about the contents of character A or B contained in component information 132 from character information stored in the character information storing unit 60. Then, the material content acquiring unit 59 acquires person information 152 about that person as the material contents from the server 11 in accordance with seeds information 130, and supplies it to the programming creating unit 61. For example, the material content acquiring unit 59 acquires person information 152 which is the contents such as the images and sounds of character A or B taken under the conditions matched with the shooting conditions for take information 135 in accordance with the motion of character A or B described in the time schedule information 131 and the take information 135, the shooting conditions are necessary for the motion.

In addition, the material content acquiring unit 59 acquires other information 160 to be the component other than person information 152 as material contents from the server 11 based on the taste information and the seeds information 130, and supplies it to the programming creating unit 61.

As shown in FIG. 10, the programming creating unit 61 creates the programming "Happy Friends" based on the person information 152 to be the material contents from the material content acquiring unit 59, the other information 160, and the seeds information 130.

FIG. 11 shows exemplary time schedule information 131 of the programming "The current music chart top 30" that is a piece of music programming of the general programming (FIG. 5).

"Title: The current music chart top 30" at the first line in the time schedule information 131 shown in FIG. 11 shows that the programming name is "The current music chart top 30". "Genre: music" at the second line shows that the genre of the programming "The current music chart top 30" is music, and "length: 30 min." at the third line shows that the time period for the programming "The current music chart top 30" is thirty minutes.

"Construction" at the fourth line shows that the construction of the piece of programming is described after the fourth line, and "new release column" at the fifth line shows that the construction of "new release column" is described after the fifth line. "Selection" at the sixth line shows that the construction of "selection" is described after the sixth line. "Length: 10 sec." at the seventh line shows that the time period for "selection" is ten seconds.

"Contents: from a music Web site, based on the taste information, display 10 new releases this week" at the eighth and ninth lines show that the contents of "selection" are crated so that the list of new releases this week is displayed as the material contents which are new release information to be the contents of the information about 10 songs that the user likes among the items of information about new releases sold this week that are stored in the server 11 and opened at a music Web site (for example, song titles, artist's names, and so on).

"Read" at the tenth line shows that the construction of "Read" is described after the tenth line, and "length: 4 min. 50 sec." at the eleventh line shows that the time period for "read" is four minutes fifty seconds.

"Contents: a master of ceremonies reads detailed information about each song displayed at selection while acquiring and displaying it" at the twelfth and thirteenth lines show that the contents of "read" are created so that a master of ceremonies reads the detailed information about songs while displaying the list of the detailed information about songs displayed as selection as the material contents are person information 152 about a person who is decided as the master of ceremonies based on the new release information and the character information and the component information 132 from the material content acquiring unit 59.

In addition, "ranking column" at the fourteenth line shows that the construction of "ranking column" is described after the fourteenth line, and "length: 20 min." at the fifteenth line shows that the time period for "ranking column" is twenty minutes.

"Contents: acquire 30 songs in descending order of which are most to least listened from a music Web site, assign ranks to the songs in descending order, display 10 songs each in ascending order of which are least to most listened as the ranking, and give comments by the master of ceremonies" at the sixteenth to eighteenth lines show that the contents of "ranking column" are created so that the material contents are acquired which are music information 161 to be the contents of information about songs that are stored in the server 11 and opened at a music Web site and the listening information 162 to be the contents of information showing the number of times to listen to those songs, song titles and artists' names are displayed as the ranking for 10 songs each in ascending order, and the master of ceremonies comments on the ranking.

"Advance notice column" at the nineteenth line shows that the construction of "advance notice column" is described after the nineteenth line, and "selection" at the twentieth line shows that the construction of "selection" is described after the twentieth line.

In addition, "length: 10 sec." at the twenty-first line shows that the time period for "selection" is ten seconds. "Contents: from a music Web site, based on the taste information, display 10 songs to be released next week" at the twenty-second and twenty-third lines show that the contents of "selection" are created so that the list of songs to be released next week is displayed as the material contents are information about songs to be released which is the contents of information about 10 songs that the user likes among the items of information about songs to be released next week that are opened at a music Web site.

"Read" at the twenty-fourth line shows that the construction of "read" is described after the twenty-fourth line, and "length: 4 min. 50 sec." at the twenty-fifth line shows that the time period for "read" is four minutes fifty seconds.

"Contents: the master of ceremonies reads detailed information about each song displayed at selection while acquiring and displaying it" at the twenty-sixth and twenty-seventh lines show that the contents of "read" are created so that the master of ceremonies reads detailed information about songs while displaying the list of detailed information about songs displayed as selection as the material contents are the information about songs to be released and person information 152 about the person who is determined as the master of ceremonies, as similar to the twelfth and thirteenth lines.

As described above, the programming "The current music chart top 30" is configured of "new release column" for five minutes which is constructed of "selection" for ten seconds and "read" for four minutes fifty seconds, "ranking column" for twenty minutes, and "advance notice column" for five minutes which is constructed of "selection" for ten seconds and "Read" for four minutes fifty seconds.

Next, the programming "The current music chart top 30" outputted to the output unit 62 will be described with reference to FIG. 12.

In FIG. 12, the material content acquiring unit 59 acquires the material contents which are person information 152 about the person decided as the master of ceremonies, music information 161, listening information 162, and other information 164 to be the components other than the person information 152, the music information 161, and the listening information 162.

The material content acquiring unit 59 assigns ranks to 30 songs corresponding to the music information 161 in descending order of which are most to least listened based on the music information 161 and the listening information 162, and creates the contents of information that associates the ranks with the music information 161 as music ranking information 163. Then, the material content acquiring unit 59 supplies the person information 152, the music ranking information 163, and the other information 164 to the programming creating unit 61.

The programming creating unit 61 performs CG processing based on the time schedule information 131 (FIG. 11) and the person information 152, and creates MC contents which are the contents of the master of ceremonies who reads song titles and artists' names corresponding to the music ranking information 163, 10 songs each in ascending order as the ranking.

The programming creating unit 61 creates the ranking contents which are the contents to display song titles and artists' names corresponding to the music ranking information 163, 10 songs each in ascending order as the ranking based on music ranking information 163.

The programming creating unit 61 combines the MC contents, the ranking contents, and the other information 164 based on the motion information 133, and supplies it as the programming "The current music chart top 30" to the output unit 62.

Consequently, as shown in FIG. 12, in the programming "The current music chart top 30" outputted to the output unit 62, the song titles and artists' names corresponding to the music ranking information 163 are displayed 10 songs each in ascending order as the ranking, and the ranking is commented by a master of ceremonies.

In addition, the user operates the remote control 84, for example, to select a desired song title to instruct purchasing it, and thus the user can buy a song of the song title. More specifically, in FIG. 12, the user instructs buying a song of the song title "Green". The charge processing unit 63 communicates with the server 11 in accordance with operation data corresponding to that instruction, and performs a charge process for the song of the song title "Green". Consequently, the user can buy the song of the song title "Green".

FIG. 13 shows exemplary time schedule information 131 about the programming "Yumi Suzuki's shopping!" that is a piece of shopping programming of the general programming (FIG. 5).

"Title: [MC's] shopping!" at the first line of the time schedule information 131 shown in FIG. 13 shows that the programming name is "[MC's] shopping!". [MC] is a variable that represents a person's name decided as a master of ceremonies by the seeds information editing unit 55, and that person's name is set to [MC]. In FIG. 13, the seeds information editing unit 55 decides "Yumi Suzuki" as a master of ceremonies, and sets [MC] to "Yumi Suzuki".

"Genre: shopping" at the second line shows that the genre of the programming "Yumi Suzuki's shopping!" is shopping, and "length: 10 min." at the third line shows that the time period for the programming "Yumi Suzuki's shopping!" is ten minutes.

"Construction" at the fourth line shows that the construction of the piece of programming is described after the fourth line, and "selection" at the fifth line shows that the construction of "selection" is described after the fifth line. "Length: 10 sec." at the sixth line shows that the time period for "selection" is ten seconds.

Figure 14:
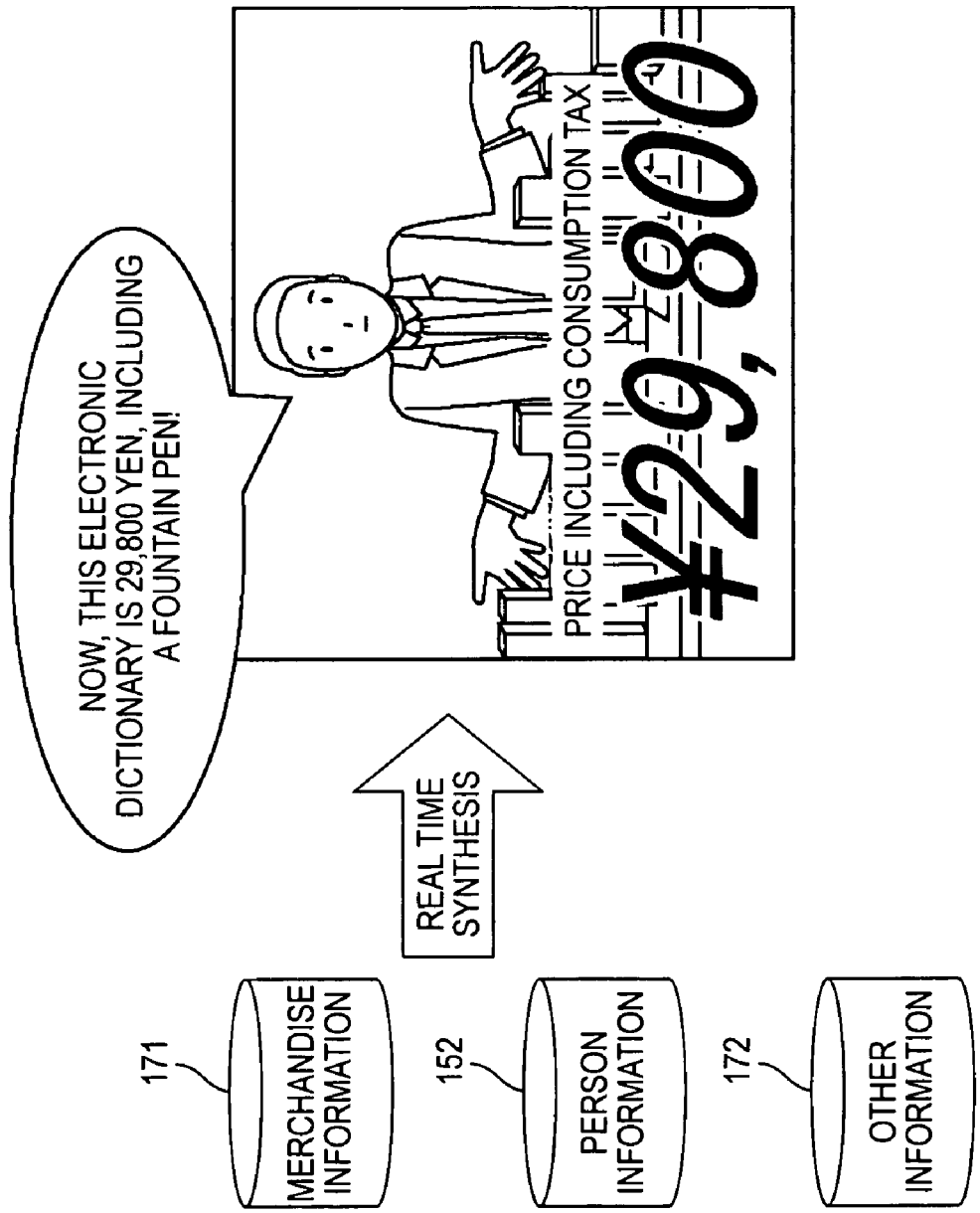
FIG. 14 shows a diagram illustrative of a piece of shopping programming.

"Contents: from a shopping Web site, based on taste information, select and display five products" at the seventh and eighth lines show that the contents of "selection" are created so as to display the list of products in which five products that a user likes are selected among products that are stored in the server 11 and opened at a shopping Web site, and the material contents are merchandise information 171 to be the contents of those products (FIG. 14 described later).

"Read" at the ninth line shows that the construction of "read" is described after the ninth line, and "length: 4 min. 50 sec." at the tenth line shows that the time period for "read" is four minutes fifty seconds.

"Contents: give comments by the master of ceremonies while displaying five products displayed at selection one by one" at the eleventh and twelfth liens show that the contents of "read" are created so that the master of ceremonies comments on a product while displaying products one by one as the material contents are merchandise information 171 and person information 152 about the person decided as the master of ceremonies.

As described above, the programming "Yumi Suzuki's shopping!" is configured of "selection" for ten seconds and "read" for four minutes fifty seconds.

Next, the programming "Yumi Suzuki's shopping!" outputted to the output unit 62 will be described with reference to FIG. 14.

In FIG. 14, the material content acquiring unit 59 acquires person information 152 about a person who is determined as a master of ceremonies, merchandise information 171, and other information 172 to be the components other than the person information 152 and the merchandise information 171 as the material contents, and supplies them to the programming creating unit 61.

The programming creating unit 61 performs CG processing based on the time schedule information 131 (FIG. 13) and the person information 152, and creates the contents of images of the master of ceremonies who comments on the merchandise information 171 as merchandise image information.

In addition, the programming creating unit 61 creates the contents of the images corresponding to the merchandise information 171 as merchandise display information based on the merchandise information 171, as well as creates the contents of sounds of the master of ceremonies who comments on a product as merchandise sound information based on the person information 152 and the merchandise information 171.

The programming creating unit 61 combines the merchandise image information, the merchandise display information, the merchandise sound information, and the other information 154 based on motion information 133, and supplies it as the programming "Yumi Suzuki's shopping!" to the output unit 62.

Consequently, as shown in FIG. 14, in the programming "Yumi Suzuki's shopping!" outputted to the output unit 62, the merchandise information 171 is displayed, and the merchandise information 171 is commented by a master of ceremonies.

Next, taste information created by the user related information creating unit 52 shown in FIG. 3 will be described with reference to FIG. 15.

As shown in FIG. 15, the user related information creating unit 52 detects (acquires) the motion of the user's body based on image data from the camera 81 of the input unit 51. Then, the user related information creating unit 52 creates (changes) taste information based on the motion.

For example, when the user related information creating unit 52 detects a small motion of the user's body, it raises the degree of tastes for the keywords related to the piece of drama programming to be a subject to watch (it determines a high degree of tastes). In addition, when the user related information creating unit 52 frequently detects the motion that the user leaves the seat, it drops the degree of tastes for the keywords related to the piece of drama programming to be a subject to watch (it determines the low degree of tastes).

More specifically, in general, when a user is watching an interested piece of drama programming, the user watches as the body does not move (in concentration). Therefore, when the user related information creating unit 52 detects the small motion of the body, it raises the degree of tastes for the keywords related to the piece of drama programming to be a subject to watch, whereas it drops the degree of tastes when it detects the motion that the user leaves the seat.

On the other hand, in the piece of music programming or the piece of sports programming, since a user does not necessarily watch images, the user sometimes likes the piece of music programming or the piece of sports programming to be a subject to watch even though the user leaves the seat. Thus, the user related information creating unit 52 does not change (create) the degree of tastes for the keywords related to the piece of music programming and the piece of sports programming to be a subject to watch based on image data from the camera 81.

In addition, the user is sometimes excited to move the body while watching an interested piece of sports programming. Thus, the user related information creating unit 52 may raise the degree of tastes for the keywords related to the piece of sports programming to be a subject to watch when it detects a large motion of the user's body.

The user related information creating unit 52 detects (acquires) the loudness of the user's voice based on sound data from the microphone 82 of the input unit 51. Then, the user related information creating unit 52 creates taste information based on the loudness of the user's voice.

For example, when the user is watching an interested piece of music programming, the user is often quiet to listen to music. Thus, the user related information creating unit 52 raises the degree of tastes for the keywords related to the piece of music programming to be a subject to watch when it detects small voice from the user or detects that the user remains silence.

In addition, a user does not always quietly watch an interested piece of drama programming or an interested piece of sports programming. Thus, the user related information creating unit 52 does not change the degree of tastes for the keywords related to the piece of drama programming or the piece of sports programming to be a subject to watch based on the loudness of the user's voice.

In addition, a user is sometimes excited to raise his/her voice when the user is watching an interested piece of sports programming. Thus, when the user related information creating unit 52 detects the user's loud voice, it raises the degree of tastes for the keywords related to the piece of sports programming to be a subject to watch.

The user related information creating unit 52 detects (acquires) user's body temperature based on body temperature data from the thermosensor 83 of the input unit 51. Then, the user related information creating unit 52 creates taste information based on the body temperature.

For example, a user is often excited to increase body temperature when the user is watching an interested piece of sports programming. Thus, the user related information creating unit 52 raises the degree of tastes for the keywords related to the piece of sports programming to be a subject to watch when it detects user's body temperature rise.

In addition, a user is not always excited when the user is watching an interested piece of drama programming or an interested piece of music programming. Thus, the user related information creating unit 52 does not change the degree of tastes for the keywords related to the piece of drama programming or the piece of music programming to be a subject to watch based on user's body temperature.

The user related information creating unit 52 detects (acquires) user's volume operation, listening history, reserve history, and replay history based on operation data from the remote control 84 of the input unit 51. Then, the user related information creating unit 52 creates listening information based on volume operation, listening history, reserve history, and replay history.

For example, a user often increases volume when the user is watching an interested piece of music programming. Thus, when the user related information creating unit 52 detects the operation to increase (raise) volume by the user, it raises the degree of tastes for the keywords related to the piece of music programming to be a subject to watch.

In addition, a user puts importance on images more than sounds in the piece of drama programming or the piece of sports programming. Thus, the user related information creating unit 52 does not change the degree of tastes for the keywords related to the piece of drama programming or the piece of sports programming to be a subject to watch based on user's volume operation.

Furthermore, the user related information creating unit 52 raises the degree of tastes for the keywords related to the piece of drama programming, the piece of music programming, or the piece of sports programming, which is specified by a user as a subject to watch, as a subject to reserve storing in the broadcast programming storing unit 58, or as a subject to play from the broadcast programming storing unit 58 based on user's listening history, reserve history, or replay history.

In addition, in FIG. 15, taste information about the keywords related to the piece of drama programming, the piece of music programming, and the piece of sports programming is described, but taste information is also created with respect to the piece of news programming, the piece of variety programming, and the piece of shopping programming similarly.

In addition, the method of creating taste information is not limited to the examples shown in FIG. 15. For example, when the camera 81 supplies image data that a user is crying, the user related information creating unit 52 may raise the degree of tastes for the keywords related to the piece of drama programming to be a subject to watch.

Furthermore, when the camera 81 supplies image data of the image that the user's eyes watch the position different from the output unit 62, the user related information creating unit 52 may drop the degree of tastes for the keywords related to the piece of drama programming to be a subject to watch.

In addition, when the camera 81 supplies image data of the image that a small child watches a piece of programming, the user related information creating unit 52 may drop the degree of tastes for the keywords related to the piece of adult drama programming to be a subject to watch.

Next, a taste information creating process done by the user related information creating unit 52 shown in FIG. 3 will be described with reference to FIG. 16. The taste information creating process is started when input information is supplied from the input unit 51, for example.

At Step S1, the user related information creating unit 52 acquires input information from the input unit 51, and moves to Step S2.

At Step S2, as described in FIG. 15, the user related information creating unit 52 decides the degree of tastes for the keywords related to the piece of programming to be a subject to watch based on the input information, creates taste information formed of the keywords and the corresponding degree of tastes, and moves to Step S3.

At Step S3, the user related information creating unit 52 stores the taste information created at Step S2 in the taste information storing unit 101, and ends the process.

Figure 16:
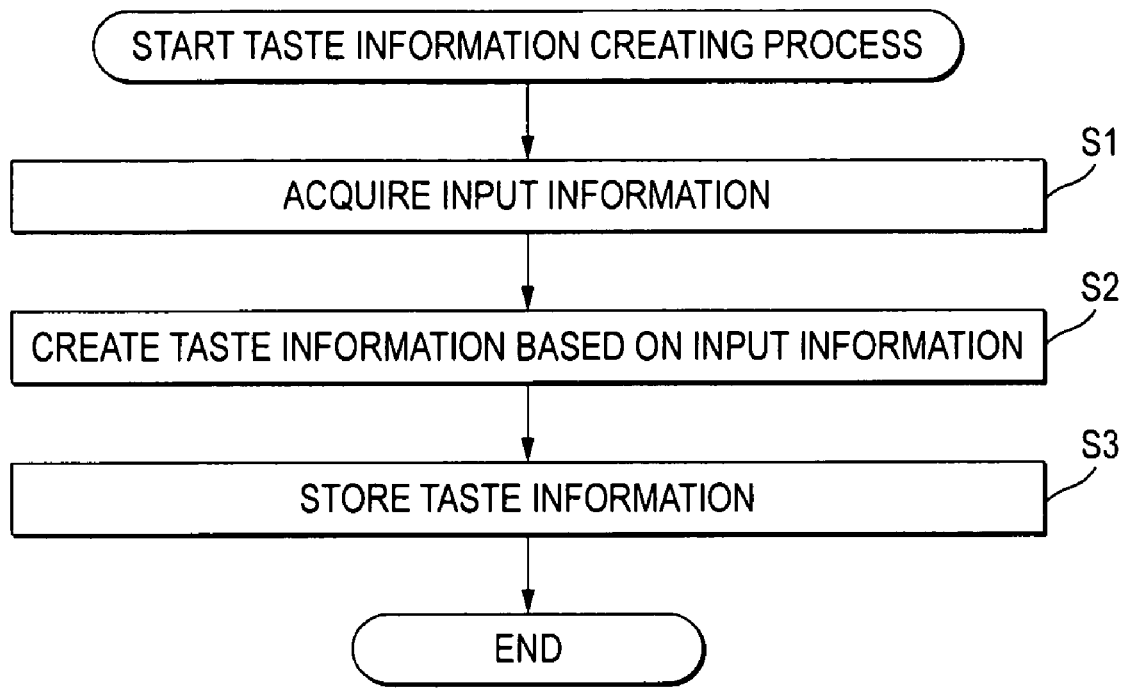
FIG. 16 shows a flow chart illustrative of a taste information creating process.

In addition, in FIG. 16, the taste information creating process done by the user related information creating unit 52 is described. However, the user related information creating unit 52 also creates user information, and stores it in the user information storing unit 102 based on sound data or operation data of input information as similar to the case of taste information.

Next, a character information storing process done by the material content acquiring unit 59 shown in FIG. 3 will be described with reference to FIG. 17. The character information storing process is started when taste information that the person name of a new person is a keyword is supplied from the taste information storing unit 101, for example.

At Step S11, the material content acquiring unit 59 acquires character information about a new person from the server 11 based on the taste information that the person name of that new person is the keywords, the taste information is supplied from the taste information storing unit 101, and moves to Step S12.

At Step S12, the material content acquiring unit 59 stores the character information acquired at Step S11 in the character information storing unit 60, and ends the process.

Next, a general programming creating process done by the programming creation apparatus 13 shown in FIG. 3 will be described with reference to FIG. 18. The general programming creating process is started when the remote control 84 receives the operation from a user who requests to display the scheduled programming table 120 (FIG. 4), for example.

At Step S21, the seeds information acquiring unit 54 acquires seeds information 130 about the piece of programming to create that the user likes and can watch at that user's age from the server 11 based on user related information from the user related information storing unit 53, supplies it to the seeds information editing unit 55, and moves to Step S22.

At Step S22, the seeds information editing unit 55 edits the seeds information 130 supplied at Step S21 based on the character information from the character information storing unit 60. Then, the seeds information editing unit 55 supplies the seeds information 130 after edited to the programming scheduling unit 56. In addition, when variables such as [character] and [MC] are not included in the seeds information 130, Step S22 is skipped.

After the process step at Step S22, the process moves to Step S23. The programming scheduling unit 56 schedules the piece of programming to create that corresponds to the seeds information 130 supplied at Step S22 and the piece of broadcast programming that corresponds to the broadcast programming information supplied from the broadcast programming storing unit 58 based on the taste information from the taste information storing unit 101. Then, the programming scheduling unit 56 creates the scheduled programming table 120 which represents the schedule of the piece of programming to create and the piece of broadcast programming, supplies the scheduled programming table 120 and the seeds information 130 to the programming creating unit 61 as well as supplies the scheduled programming table 120 to the output unit 62, and moves to Step S24.

At Step S24, the output unit 62 outputs the scheduled programming table 120 supplied at Step S23, and moves to Step S25.

At Step S25, the input unit 51 determines whether the user specifies the piece of programming to be a subject to watch. When it determines that the piece of programming is not specified, it waits until the piece of programming is specified.

On the other hand, at Step S25, when the input unit 51 determines that the user specifies the piece of programming to be a subject to watch, it supplies operation data corresponding to the operation of specifying the piece of programming to be a subject to watch by the user to the programming creating unit 61, and moves to Step S26.

At Step S26, the programming creating unit 61 determines whether the piece of programming that is specified by the user to watch is the piece of broadcast programming based on operation data from the input unit 51. When it determines that the specified programming is not the piece of broadcast programming, it supplies the seeds information 130 to the material content acquiring unit 59, and moves to Step S27.

At Step S27, the material content acquiring unit 59 acquires material contents from the server 11 based on the seeds information from the programming creating unit 61, the character information stored in the character information storing unit 60, and the taste information from the taste information storing unit 101, supplies them to the programming creating unit 61, and moves to Step S28.

At Step S28, the programming creating unit 61 creates a piece of general programming based on the material contents supplied from the seeds information 130 and at Step S27, and supplies it to the output unit 62. In addition, the detail of a process to create the piece of general programming will be described later with reference to FIGS. 19 to 22. Moreover, to the user related information creating unit 52, the programming creating unit 61 supplies words included in the seeds information 130 (for example, the genre and so on) or words corresponding to the material contents (for example, names of people and objects, place names and so on) as the keywords related to the piece of general programming, and moves to Step S30.

On the other hand, at Step S26, when it is determined that the piece of programming that is specified by the user to watch is the piece of broadcast programming, the process is moved to Step S29. The programming creating unit 61 reads the piece of broadcast programming to be a subject to watch and the broadcast programming information out of the broadcast programming storing unit 58, and outputs the piece of broadcast programming to the output unit 62. Then, the programming creating unit 61 selects the keywords related to the piece of broadcast programming from the broadcast programming information, supplies them to the user related information creating unit 52, and moves to Step S30.

At Step S30, the output unit 62 outputs the general piece of programming supplied at Step S28 or the piece of broadcast programming supplied at Step S29, and moves to Step S31.

At Step S31, the input unit 51 determines whether a product corresponding to the piece of programming outputted at Step S30 is purchased, that is, whether the user operates an instruction to buy a product corresponding to the piece of programming the user is being viewed.

At Step S31, when it is determined that a product is purchased, the input unit 51 supplies operation data corresponding to that operation to the charge processing unit 63, and moves to Step S32. At Step S32, the charge processing unit 63 communicates with the server 11 in accordance with the operation data from the input unit 51, and performs a charge process for the product to be a subject for purchase. Thus, the user can buy the product.

When it is determined that a product is not purchased at Step S31, or after a process step at Step S32, the process is moved to Step S33, and the programming creating unit 61 determines whether to end the piece of programming.

More specifically, for example, when the programming creating unit 61 determines that the user requests to display the scheduled programming table 120 in accordance with the operation data from the input unit 51, or that the user requests to change the piece of programming to be a subject to watch to a piece of programming before or after the piece of programming to be a subject to watch now in the scheduled programming table 120 by operating an arrow key on the remote control 84 (not shown), it determines that the piece of programming is ended. In addition, the programming creating unit 61 determines that the piece of programming is ended, when the piece of programming to be outputted to the output unit 62 is ended.

At Step S31, when the programming creating unit 61 determines not to end the piece of programming, it returns to Step S26, and repeats the process steps described above. Therefore, at Step S27, the programming creating unit 61 can acquire the material contents of the piece of general programming to be outputted next time based on the taste information corresponding to the input information acquired during the output of the piece of general programming at the previous process step of Step S30. More specifically, the programming creating unit 61 can create the programming subsequent to the piece of general programming in consideration of the user's tastes for the piece of general programming already outputted. Consequently, the user's tastes can be quickly reflected to the piece of general programming.

In addition, at Step S33, when the programming creating unit 61 determines to end the piece of programming, it ends the process.

As described above, in the programming creation apparatus 13 shown in FIG. 3, the seeds information 130 is acquired, the piece of programming is scheduled, and the material content is acquired based on (the taste information of) the user related information.

Thus, the piece of programming that a user likes can be outputted in the schedule that the user likes.

In addition, in FIG. 18, the general programming creating process is started when the remote control 84 accepts the operation to request to display the scheduled programming table 120 from the user. However, the general programming creating process may be started when the operation to request to display the scheduled piece of programming is accepted by the user. In this case, the programming creation apparatus 13 shown in FIG. 3 does not output the scheduled programming table 120 (it does not perform the process steps at Steps S24 and S25), it sets the piece of programming at the beginning of the scheduled programming table 120 to a subject to watch.

Figure 19:
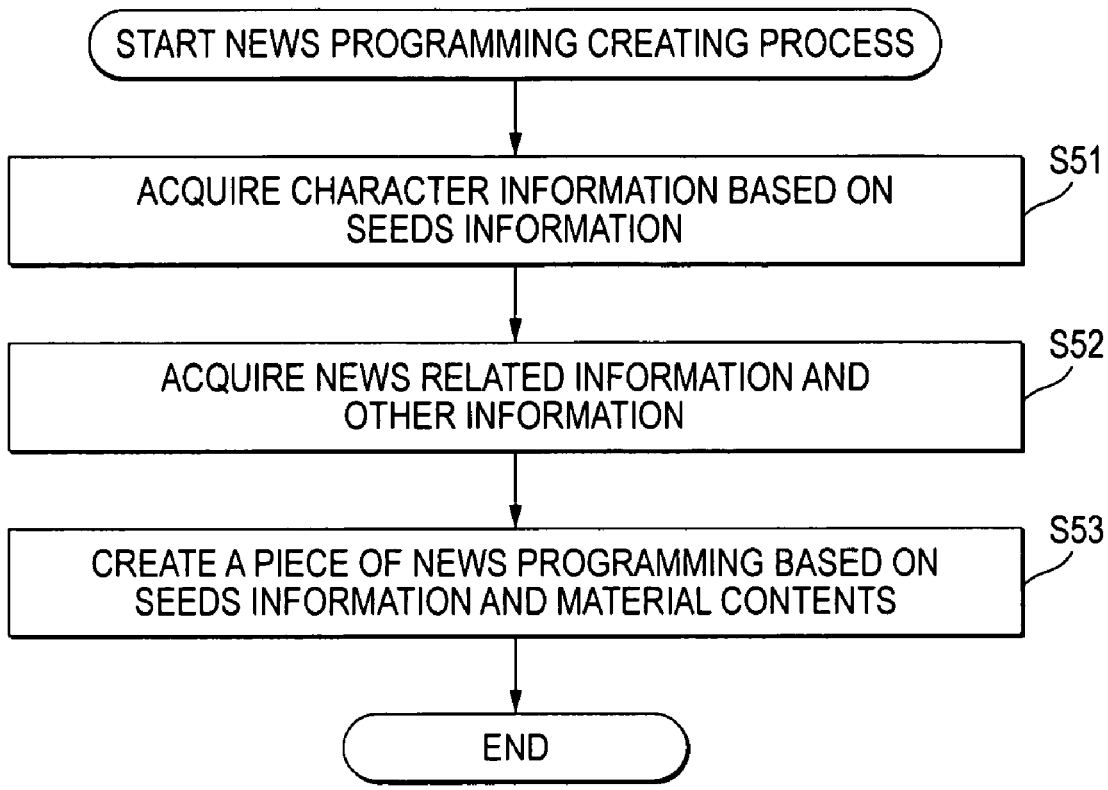
FIG. 19 shows a flow chart illustrative of a news programming creating process.

Next, a news programming creating process done by the material content acquiring unit 59 and the programming creating unit 61 at Steps S27 and S28 shown in FIG. 18 will be described with reference to FIG. 19.

At Step S51, the material content acquiring unit 59 acquires person information 152 about a person who is decided as a caster by the seeds information editing unit 55 based on seeds information 130 supplied from the programming creating unit 61, and supplies it to the programming creating unit 61.

More specifically, at Step S22 shown in FIG. 18, the seeds information editing unit 55 decides a person who is matched with component information 132 as a caster among people registered as character information. Then, the seeds information editing unit 55 sets the person's name to [Caster] in time schedule information 131, and thus edits the seeds information 130. The material content acquiring unit 59 acquires person information 152 about the person who is set to [Caster] as the material contents from the server 11 based on the seeds information 130 after edited, and supplies it to the programming creating unit 61.

After the process step at Step S51, the process is moved to Step S52. The material content acquiring unit 59 acquires news related information 153 and other information 154 as the material contents from the server 11 based on the seeds information 130 and user related information, supplies them to the programming creating unit 61, and moves to Step S53.

At Step S53, the programming creating unit 61 creates a piece of news programming based on the seeds information 130, the person information 152 supplied as the material contents at Steps S51 and S52, the news related information 153, and other information 154, and ends the process.

Figure 20:
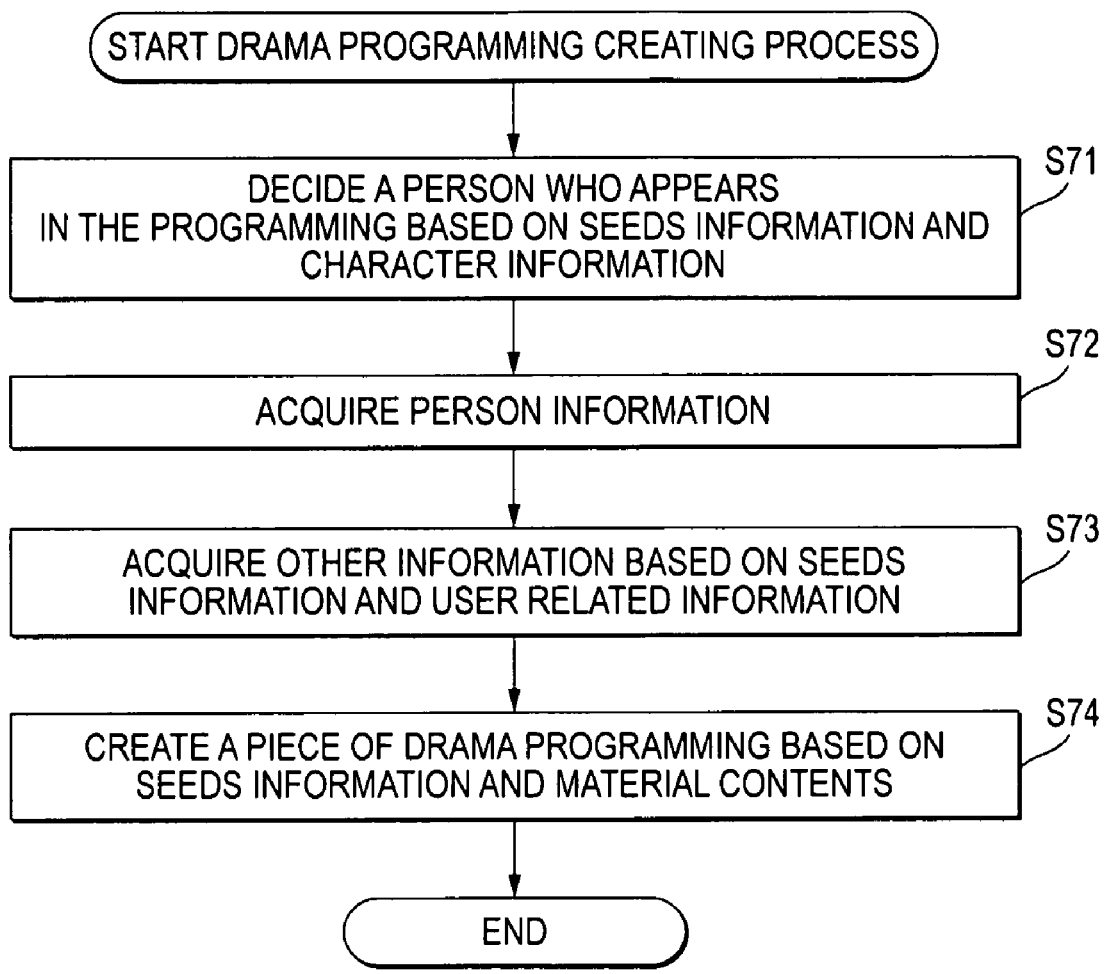
FIG. 20 shows a flow chart illustrative of a drama programming creating process.

Next, a drama programming creating process done by the material content acquiring unit 59 and the programming creating unit 61 at Steps S27 and S28 shown in FIG. 18 will be described with reference to FIG. 20.

Figure 17:
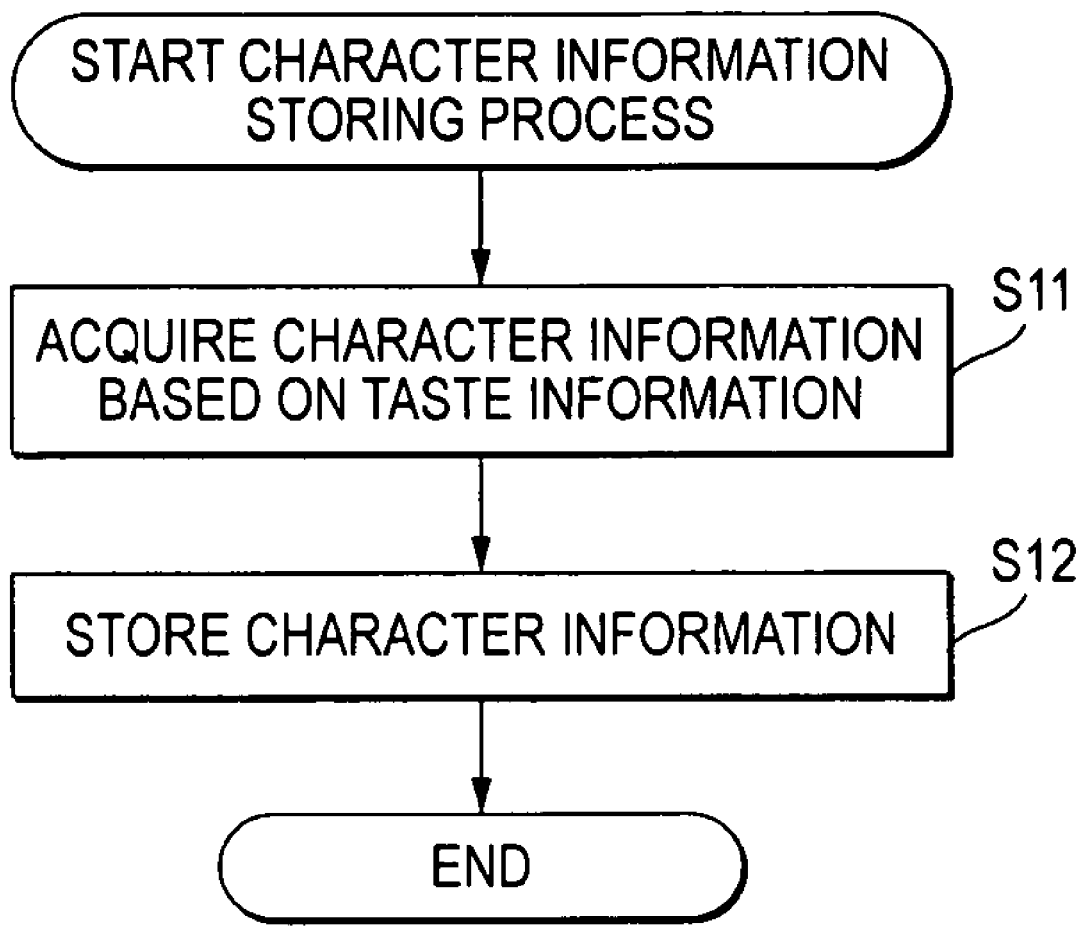
FIG. 17 shows a flow chart illustrative of a character information storing process.

At Step S71, the material content acquiring unit 59 decides a character to be an actor or actress (for example, a person who acts the role of character A or B) based on the component information 132 of the seeds information 130 supplied from the programming creating unit 61 and the character information stored at Step S12 in FIG. 17.

More specifically, the material content acquiring unit 59 decides a person who is matched with information such as the shape and sound quality of the contents of a person who appears in the programming included in the component information 132 as a character to be the actor or actress among people registered in character information. As described above, the material content acquiring unit 59 selects a person who is matched with the component information 132 from the character information acquired based on the taste information, and decides that person as the person to be an actor or actress. Thus, a person who the user likes can be decided as a person to be an actor or actress. Consequently, a person who the user likes can be presented in a piece of drama programming to be the piece of general programming.

After the process step of Step S71, the process is moved to Step S72. The material content acquiring unit 59 acquires person information about the person decided at Step S71 as the material contents from the server 11, supplies it to the programming creating unit 61, and moves to Step S73.

At Step S73, the material content acquiring unit 59 acquires other information 160 as the material contents from the server 11 based on the seeds information 130 and the user related information from the user related information storing unit 53, and supplies it to the programming creating unit 61.

For example, the material content acquiring unit 59 selects the subsequent scene at "select 1" in time schedule information 131 based on the taste information of the user related information. Then, the material content acquiring unit 59 acquires the other information 160 to be the components other than person information 152 in the selected scene as the material contents based on the component information 132 and user related information.

After the process steps at Step S73, the process is moved to Step S74. The programming creating unit 61 creates a piece of drama programming based on the seeds information 130, and the person information 152 supplied as the material contents at Steps S72 and S73 and the other information 160, and ends the process.

As described above, the programming creation apparatus 13 shown in FIG. 3 creates a piece of drama programming in which a person who the user likes is an actor or actress based on the seeds information 130 that the user likes. Thus, it can create the piece of drama programming that the user likes. Consequently, for example, the programming creation apparatus 13 shown in FIG. 3 can dramatize an original that has not been dramatized yet, or can create a piece of general programming which is a piece of drama programming in which an actor or actress in a piece of drama programming to be the piece of broadcast programming broadcast by the broadcast station 14 is changed to a person who the user likes.

Figure 21:
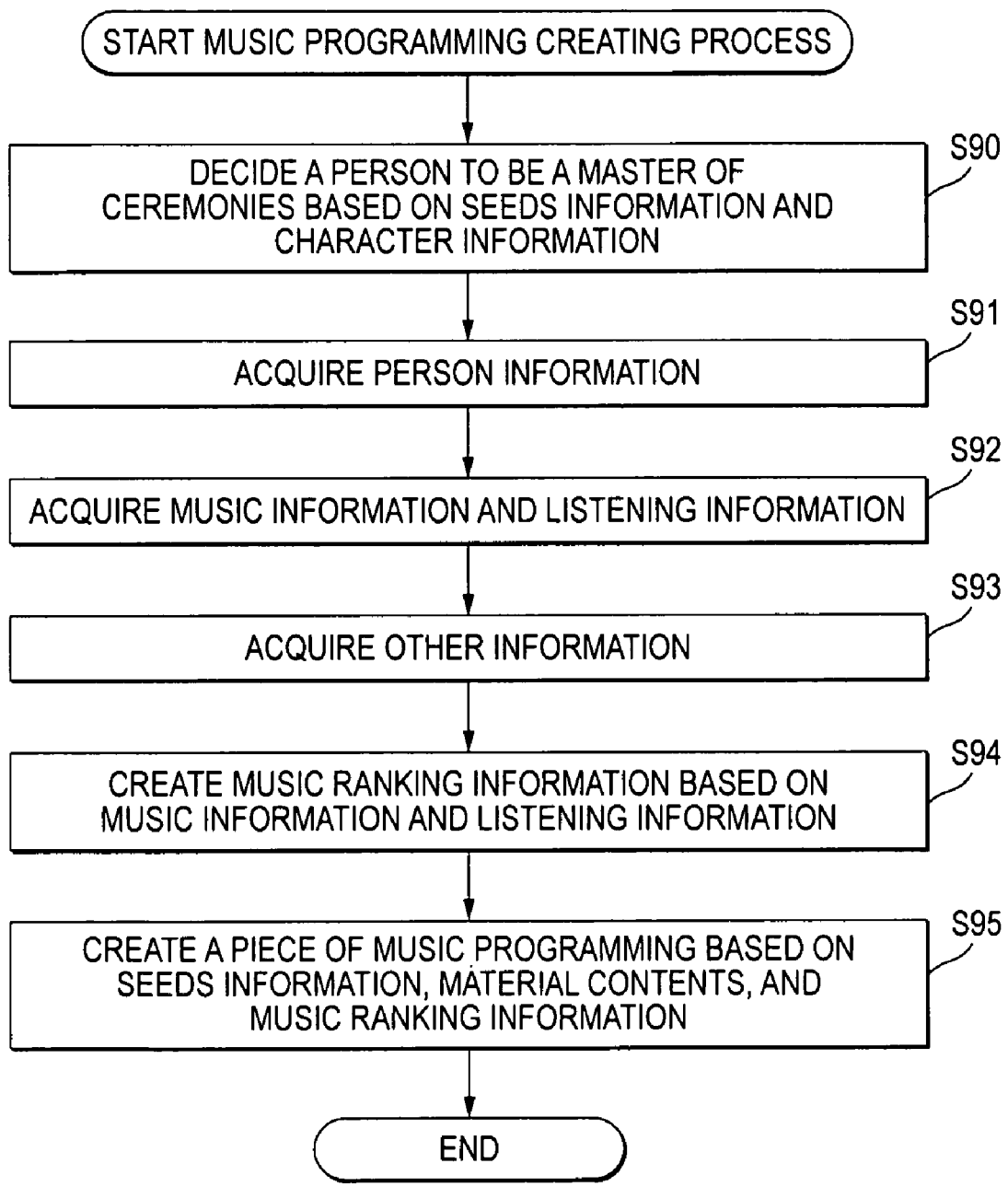
FIG. 21 shows a flow chart illustrative of a music programming creating process.

Next, a music programming creating process done by the material content acquiring unit 59 and the programming creating unit 61 at Steps S27 and S28 shown in FIG. 18 will be described with reference to FIG. 21.

At Step S90, the material content acquiring unit 59 decides a person to be a master of ceremonies based on the component information 132 of the seeds information 130 supplied from the programming creating unit 61 and the character information stored at Step S12 shown in FIG. 17, and moves to Step S91.

At Step S91, the material content acquiring unit 59 acquires person information 152 about a person who is decided at Step S90 as the material contents from the server 11, supplies it to the programming creating unit 61, and moves to Step S92.

At Step S92, the material content acquiring unit 59 acquires music information 161 and listening information 162 as the material contents from the server 11, supplies them to the programming creating unit 61, and moves to Step S93.

At Step S93, the material content acquiring unit 59 acquires other information 164 to be the components other than the music information 161 and the listening information 162 as the material contents from the server 11 based on the user related information and the seeds information 130, supplies them to the programming creating unit 61, and moves to Step S94.

At Step S94, the programming creating unit 61 creates music ranking information 163 based on the music information 161 supplied as the material contents at Step S92 and the listening information 162, and moves to Step S95.

At Step S95, the programming creating unit 61 creates a piece of music programming based on the seeds information 130, the person information 152 and the other information 164 supplied as the material contents at Steps S91 and S93, and the music ranking information 163 created at Step S94, and ends the process.

Figure 22:
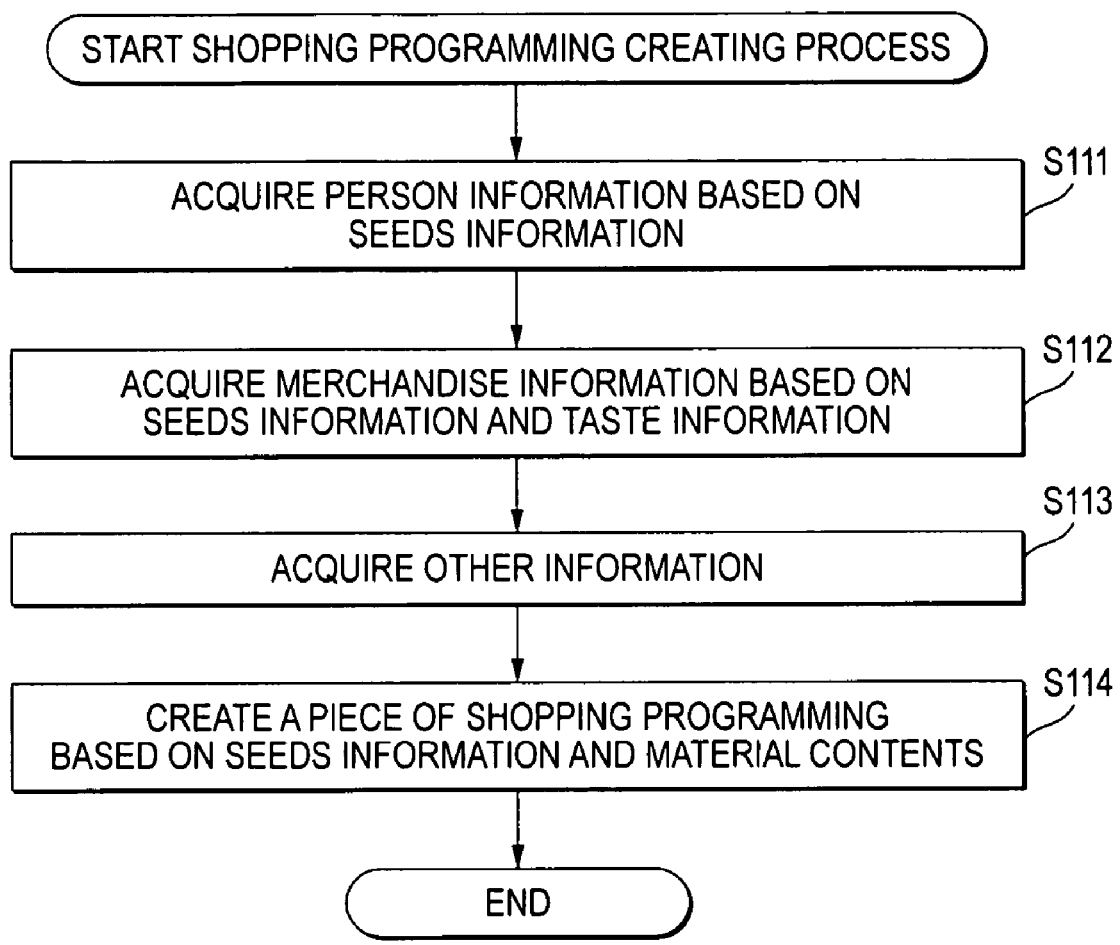
FIG. 22 shows a flow chart illustrative of a shopping programming creating process.

Next, a shopping programming creating process done by the material content acquiring unit 59 and the programming creating unit 61 at Steps S27 and S28 shown in FIG. 18 will be described with reference to FIG. 22.

At Step S111, the material content acquiring unit 59 acquires person information 152 about a person who is decided as a master of ceremonies by the seeds information editing unit 55 based on the seeds information 130 supplied from the programming creating unit 61, supplies it to the programming creating unit 61, and moves to Step S112.

At Step S112, the material content acquiring unit 59 acquires the merchandise information 171 as material contents from the server 11 based on the component information 132 of the seeds information 130 and the taste information of user related information supplied from the user related information storing unit 53, supplies it to the programming creating unit 61, and moves to Step S113.

At Step S113, the material content acquiring unit 59 acquires other information 154 to be the component other than the merchandise information 171 as the material contents from the server 11 based on the component information 132 of the seeds information 130 and the user related information, supplies it to the programming creating unit 61, and moves to Step S115.

At Step S115, the programming creating unit 61 creates a piece of shopping programming based on the seeds information 130, the merchandise information 171 supplied as the material contents at Steps S111 to S113, and the other information 172, and ends the process.

Figure 23:
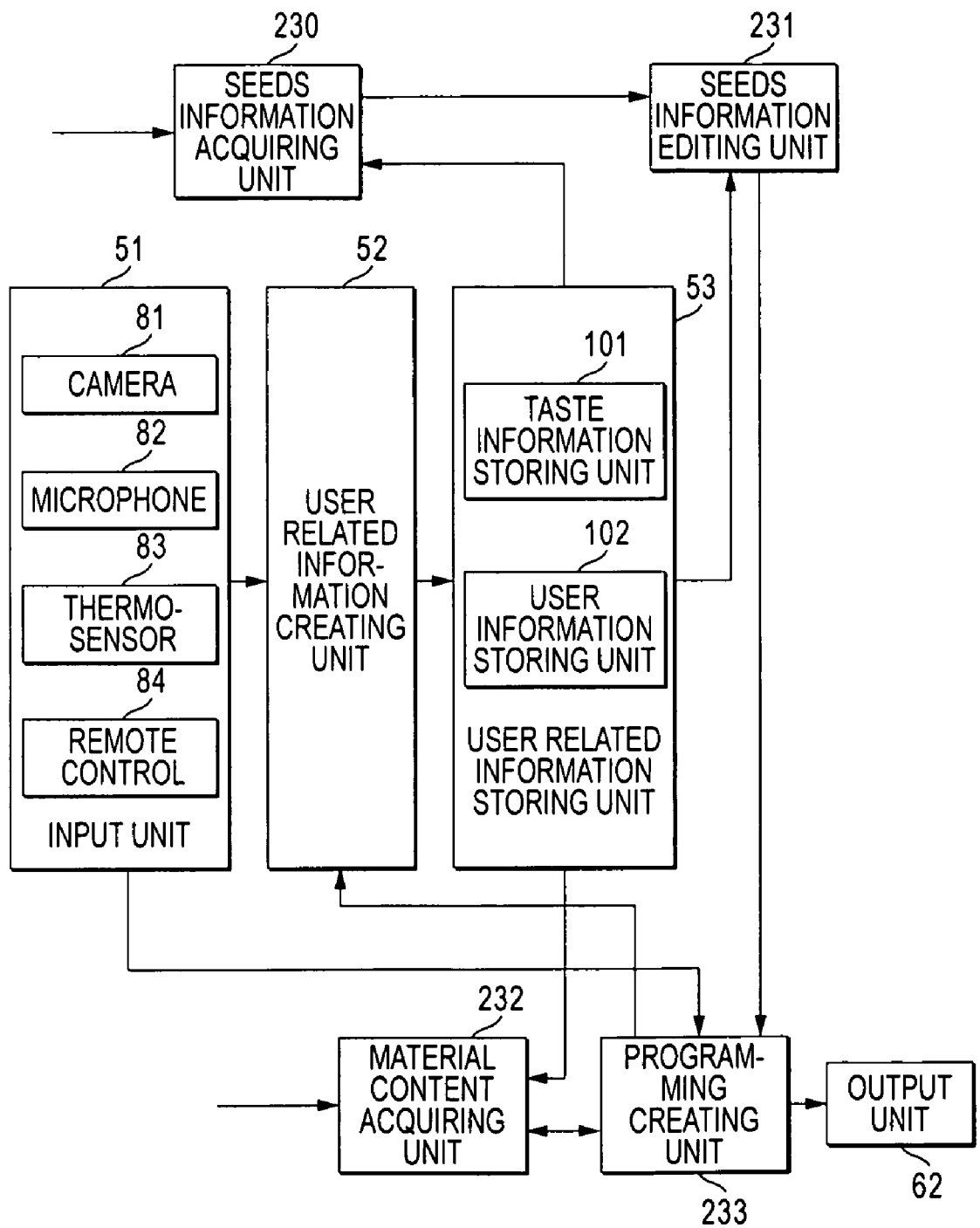
FIG. 23 shows a block diagram illustrating another exemplary functional configuration of the programming creation apparatus shown in FIG. 1.

FIG. 23 shows a block diagram illustrating another exemplary functional configuration of the programming creation apparatus 13 shown in FIG. 1.

In addition, in FIG. 23, a PC 12 executes a predetermined program to provide a predetermined game for the user, and records the contents of that game in a recording unit 39 of the PC 12 (FIG. 2). Then, as the material contents, a programming creation apparatus 13 acquires game information 250 to be game contents (for example, the contents of information such as images, sounds, comments on the game and user operation) recorded in the recording unit 39 of the PC 12 (FIG. 25 described later). In addition, for the convenience of explanation, it is considered that the programming creation apparatus 13 shown in FIG. 23 acquires seeds information 130 from the server 11.

The programming creation apparatus 13 shown in FIG. 23 is configured to have an input unit 51, a user related information creating unit 52, a user related information storing unit 53, an output unit 62, a seeds information acquiring unit 230, a seeds information editing unit 231, a material content acquiring unit 232, and a programming creating unit 233. The programming creating unit 233 creates a piece of programming to create whose genre is "game" such as best scenes of a game (hereinafter, called the piece of game programming). In addition, the same elements as those of FIG. 3 are designated the same numerals and signs, omitting the description.

The seeds information acquiring unit 230 acquires seeds information 130 about the piece of game programming from the server 11 based on user related information from the user related information storing unit 53, and supplies it to the seeds information editing unit 231. Moreover, the seeds information 130 about the piece of game programming does not include take information 135.

In addition, hereinafter, for the convenience of explanation, it is considered that the seeds information 130 about the piece of game programming does not include background information 134 as well, but seeds information 130 may include background information 134. In this case, the material content acquiring unit 232 acquires the contents of backgrounds as material contents in addition to the game information 250 based on the background information 134. Then, the programming creating unit 233 combines the game information 250 with the contents of backgrounds based on motion information 133, and creates a piece of game programming.

The seeds information editing unit 231 edits seeds information 130 based on the seeds information 130 from the seeds information acquiring unit 230 and taste information from the user related information storing unit 53. For example, the seeds information editing unit 231 edits the seeds information 130 by changing the order of the construction described in time schedule information 131 of the seeds information 130 based on the taste information. The seeds information editing unit 231 supplies the seeds information 130 after edited to the programming creating unit 233.

The material content acquiring unit 232 acquires the game information 250 as the material contents from the PC 12 based on the user related information from the user related information storing unit 53 and the seeds information 130 from the programming creating unit 233, and supplies it to the programming creating unit 233.

The programming creating unit 233 supplies the title of the piece of game programming to the output unit 62 and displays it thereon based on the seeds information 130 from the seeds information editing unit 231. Here, the user operates the remote control 84 to specify the title of the piece of game programming to be a subject to watch that is displayed on the output unit 62 by operating. The programming creating unit 233 decides the piece of game programming to be a subject to watch based on operation data from the remote control 84.

Then, the programming creating unit 233 supplies the seeds information 130 about the piece of game programming to be a subject to watch to the material content acquiring unit 232. The programming creating unit 233 creates a piece of game programming based on the seeds information 130 and the game information 250 supplied as the material contents from the material content acquiring unit 232, and supplies it to the output unit 62. In addition, the programming creating unit 233 supplies the keywords related to the piece of game programming to be a subject to watch to the user related information creating unit 52.

FIG. 24 shows exemplary time schedule information 131 for a piece of game programming (FIG. 5).

"Title: Sangoku's best scenes" at the first line in the time schedule information 131 shown in FIG. 24 shows that the programming name is "Sangoku's best scenes". "Genre: game" at the second line shows that the genre of the programming "Sangoku's best scenes" is the game, and "length: five minutes" at the third line shows that the time period for the programming "Sangoku's best scenes" is five minutes.

"Construction" at the fourth line shows that the construction of the piece of programming is described after the fourth line, and "scene 1" at the fifth line shows that the construction of "scene 1" is described after the fifth line. "Length: 3 min." at the sixth line shows that the time period for "scene 1" is three minutes.

"Contents: acquire and display game information when a user wins Commander of rank A" at the seventh to eighth lines show that the material contents are game information 250 that a user likes and that a character operated by the user wins a commander whose strength is rank A among the contents of the game "Sangoku" recorded in the recording unit 39 of the PC 12 and the images and sounds corresponding to the material contents are outputted as "scene 1".

"Scene 2" at the ninth line shows that the construction of "scene 2" is described after the ninth line, and "length: 3 min." at the tenth line shows that the time period for "scene 2" is three minutes. "Contents: acquire and display game information when a user wins a commander of rank B" at the eleventh and twelfth lines show that the material contents are game information 250 that a user likes and that a character operated by the user wins a commander whose strength is rank B among the contents of the game "Sangoku" recorded in the recording unit 39 of the PC 12 and the images and sounds corresponding to the material contents are outputted as "scene 2".

In addition, the time schedule information 130 for the piece of game programming is not limited to the example shown in FIG. 24, which may search information such as chat during a game to decide best scenes and form game information 250 about those best scenes as the material contents.

Next, the programming "Sangoku's best scenes" outputted to the output unit 62 will be described with reference to FIG. 25.

In FIG. 25, the programming creating unit 233 creates a piece of game programming based on the game information 250 from the material content acquiring unit 232 and motion information 133, and supplies it to the output unit 62.

Consequently, as shown in FIG. 25, in the piece of game programming outputted to the output unit 62, the image of a predetermined scene in the game is displayed, and the sounds in that scene are made.

Figure 26:
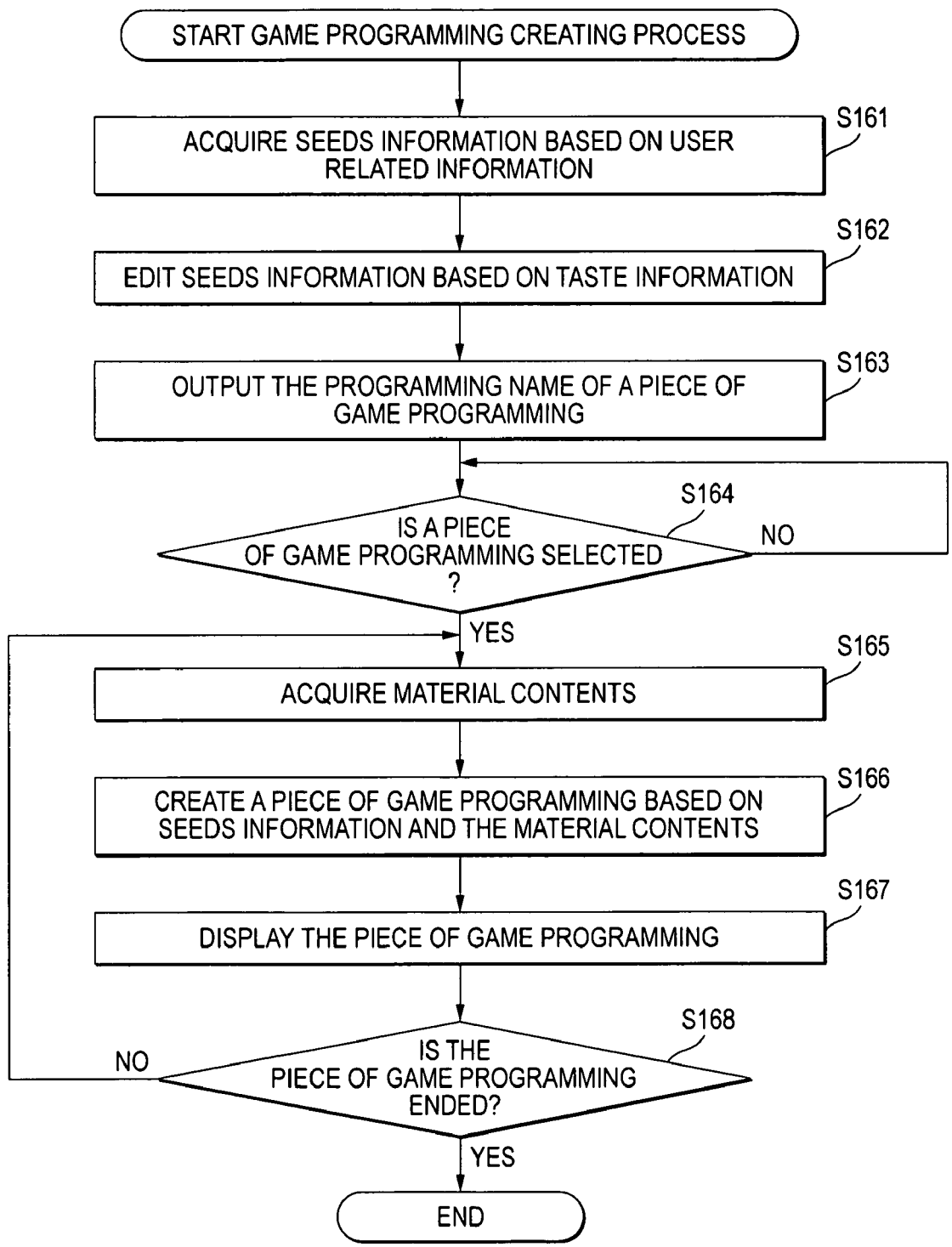
FIG. 26 shows a flow chart illustrative of a game programming creating process.

Next, a game programming creating process done by the programming creation apparatus 13 shown in FIG. 23 will be described with reference to FIG. 26. The game programming creating process is started when the remote control 84 accepts the operation to request to create a piece of game programming, for example.

At Step S161, the seeds information acquiring unit 230 acquires seeds information 130 about the piece of game programming that the user likes and can watch at that user's age (FIG. 24) from the server 11 based on user related information from the user related information storing unit 53, supplies it to the seeds information editing unit 231, and moves to Step S162.

At Step S162, the seeds information editing unit 231 edits the seeds information 130 supplied at Step S161 based on taste information from the taste information storing unit 101. Then, the seeds information editing unit 231 supplies the seeds information 130 after edited to the programming creating unit 233, and moves to Step S163.

At Step S163, the programming creating unit 233 outputs the programming name of the piece of game programming to the output unit 62 based on the seeds information 130 from the seeds information editing unit 231, and moves to Step S164.

At Step S164, the programming creating unit 233 determines whether the user selects (specifies) the piece of game programming to be a subject to watch, that is, for example, whether the user operates the remote control 84 to specify a desired programming while watching programming names displayed on the output unit 62.

At Step S164, when it determines that the user does not specify a piece of game programming to be a subject to watch, it waits until the user specifies a piece of game programming.

On the other hand, at Step S164, when the programming creating unit 233 determines that the user specifies a piece of game programming to be a subject to watch, it supplies the seeds information 130 about that piece of game programming to be a subject to watch to the material content acquiring unit 232, and moves to Step S165.

At Step S165, the material content acquiring unit 232 acquires the game information 250 recorded in the recording unit 39 of the PC 12 as material contents based on the user related information from the user related information storing unit 53 and the seeds information 130 from the programming creating unit 233, supplies them to the programming creating unit 233, and moves to Step S166.

At Step S166, the programming creating unit 233 creates a piece of game programming based on the seeds information 130, and the game information 250 supplied as the material contents at Step S165, supplies it to the output unit 62, and moves to Step S167.

At Step S167, the output unit 62 outputs the piece of game programming supplied at Step S166, and moves to Step S168.

At Step S168, the programming creating unit 233 determines whether to end the piece of game programming. More specifically, the programming creating unit 233 determines to end the piece of game programming when the user requests to display programming names of pieces of game programming, or when the piece of game programming is ended, for example. In the other cases, it determines not to end the piece of game programming.

At Step S168, when the programming creating unit 233 determines not to end the piece of programming, it returns to Step S165, and repeats the process steps described above. In addition, at Step S168, when the programming creating unit 233 determines to end the piece of programming, it ends the process.

In addition, the material content acquiring unit 232 shown in FIG. 23 acquires the game contents from the PC 12 through the network 17. However, for example, it may also acquire game contents from other PCs (not shown) connected to the PC 12 through the network such as the Internet.

For example, when a user uses the PC 12 to play a game in communication with another PC, another PC records the contents (for example, images from different view points) other than the game information 250 recorded in the recording unit 39 of the PC 12 even the same scene in that game.

Then, the material content acquiring unit 232 acquires the game contents as the material contents from another PC, and supplies them to the programming creating unit 233. Thus, the programming creating unit 233 can display the images from different view points in the same scene as a piece of game programming, for example.

In addition, the programming creation apparatus 13 shown in FIGS. 3 and 23 can also store the piece of programming to create, and offer it to another apparatus. Therefore, for example, the pieces of game programming corresponding to the play done by a person good at the game, to the play done by friends, and to the best play can be watched each other between users.

Furthermore, the piece of music programming created by the programming creation apparatus 13 may be a piece of programming to create that in turn outputs songs, for example, as well as the piece of programming to create that displays music ranking described in FIGS. 11 and 12 described above.

In this case, the construction of the genres of songs to be a subject to output is described as the time schedule information 131 of the seeds information 130. The material content acquiring unit 59 acquires the music contents that a user likes as material contents among the genres of songs described in the time schedule information 131 based on the time schedule information 131 and the taste information. Then, the programming creating unit 61 in turn outputs the songs corresponding to the material contents in accordance with the time schedule information 131, and then outputs the piece of music programming. Therefore, for example, a piece of music programming can be created which outputs songs that the user likes in refined order of arrangement based on the seeds information 130 that is created by a DJ (Disk Jockey) with refined tastes.

In addition, in the embodiment, the user related information creating unit 52 decides the degree of tastes with respect to the keywords supplied from the programming creating unit 61 (233) to create taste information. However, keywords inputted by a user may be taste information. In this case, for example, the user operates the remote control 84 to input a keyword (for example, soccer) that the user likes while watching a screen which sets keywords that the user likes and are displayed on the output unit 62. The remote control 84 supplies the operation data corresponding to the operation to the user related information creating unit 52. The user related information creating unit 52 sets the keyword corresponding to the operation data to taste information.

Furthermore, the PC 12 and the programming creation apparatus 13 may be configured in separate devices, or may be configured in a single device.

As described above, the programming creation apparatus 13 shown in FIG. 3 creates the piece of programming to create based on the taste information, the material contents, and the seeds information 130 including the time schedule information 131 showing the motion of the component in the piece of programming to create. Therefore, it can create the piece of programming that a user likes.

Here, in the specification, the process steps that describe a program to allow a computer to execute various processes are not necessarily done in a time series along the order described as flowcharts, which may also include processes in parallel or separately (for example, parallel processing or processing by objects).

In addition, the program may be processed by a single computer, or may be done by distributed processing with multiple computers. Furthermore, the program may be forwarded to a remote computer to execute it.

It should be understood by those skilled in the art that various modifications, combinations, sub-combinations and alternations may occur depending on design requirements and other factors insofar as they are within the scope of the appended claims or the equivalents thereof.

What is claimed is:

1. An information processing apparatus which creates a predetermined piece of programming, comprising:
    sensor means for detecting physical characteristics of a user while the user operates a content providing device, the sensor means generating taste information based on detected physical characteristics of the user, including a body temperature;
    taste information acquiring means for acquiring taste information showing user's tastes from said sensor means;
    material information acquiring means for acquiring a component to be inserted in the piece of programming as material information;
    construction information acquiring means for acquiring construction information that describes a construction of the piece of programming and includes motion information corresponding to the component in the piece of programming; and
    creating means for creating a content of the piece of programming, including the component, based on the taste information, the material information, and the construction information.

2. The information processing apparatus according to claim 1, wherein the construction information acquiring means acquires the construction information based on the taste information.

3. The information processing apparatus according to claim 1, wherein the material information acquiring means acquires the material information based on the taste information.

4. The information processing apparatus according to claim 3, wherein the construction information acquiring means acquires the construction information based on the taste information.

5. The information processing apparatus according to claim 1, further comprising creating means which creates the taste information based on input information inputted by a user while the piece of programming is being watched, wherein the taste information acquiring means acquires taste information created at the creating means; and the creating means creates the piece of programming based on taste information created in accordance with input information inputted by the user who is watching the piece of programming, the material information, and the construction information, while the piece of programming is being created.

6. The information processing apparatus according to claim 1, wherein the construction information acquiring means further edits the construction information based on the taste information; and the creating means creates the piece of programming based on the taste information, the material information, and construction information edited at the construction information acquiring means.

7. An information processing method causing an information processing apparatus to create a predetermined piece of programming, comprising:
    monitoring, at an input unit, physical characteristics of a user while the user operates a content providing device, including a body temperature;
    generating, in a user related information creating unit, taste information showing user's tastes based on detected physical characteristics collected during the monitoring;
    acquiring, in a material content acquiring unit, a component to be inserted in a piece of programming as material information;
    acquiring, in a seed information acquiring unit, construction information that describes a construction of the piece of programming and includes motion information corresponding to the component in the piece of programming; and
    creating, in a program creating unit, a content of the piece of programming, including the component, based on the taste information, the material information, and the construction information.

8. The information processing method according to claim 7, wherein at the acquiring construction information, the construction information is acquired based on the taste information.

9. The information processing method according to claim 7, wherein at the acquiring a component, the material information is acquired based on the taste information.

10. The information processing method according to claim 9, wherein at the acquiring construction information, the construction information is acquired based on the taste information.

11. The information processing method according to claim 7, further comprising creating the taste information based on input information inputted by a user while the piece of programming is being watched, wherein at the acquiring taste information, taste information created at the creating the taste information is acquired; and at the creating the piece of programming, the piece of programming is created based on taste information created in accordance with input information inputted by the user who is watching the piece of programming, the material information, and the construction information, while the piece of programming is being created.

12. The information processing method according to claim 7, wherein at the acquiring construction information, the construction information is further edited based on the taste information; and at the creating the piece of programming, the piece of programming is created based on the taste information, the material information, and construction information edited at the construction information acquiring means.

13. A computer readable medium including computer executable instructions, wherein the instructions, when executed by a processor, cause the processor to perform a method that creates a predetermined piece of programming, the method comprising:

monitoring physical characteristics of a user while the user operates a content providing device, including a body temperature;

generating taste information showing user's tastes based on detected physical characteristics collected during the monitoring;

acquiring a component to be inserted in a piece of programming as material information;

acquiring construction information that describes a construction of the piece of programming and includes motion information corresponding to the component in the piece of programming; and creating a content of the piece of programming, including the component, based on the taste information, the material information, and the construction information.

14. An information processing apparatus which creates a predetermined piece of programming, comprising:

a sensor configured to monitor physical characteristics of a user while the user operates a content providing device, the sensor configured to generate taste information based on detected physical characteristics of the user, including a body temperature;

a taste information acquiring module configured to acquire taste information showing user's tastes from the sensor;

a material information acquiring module configured to acquire a component to be inserted in the piece of programming as material information;

a construction information acquiring module configured to acquire construction information that describes a construction of the piece of programming and includes motion information corresponding to the component in the piece of programming; and a creating module configured to create a content of the piece of programming, including the component, based on the taste information, the material information, and the construction information.

15. The information processing apparatus according to claim 14, wherein the sensor is a camera, and the camera is configured to generate taste information based on results of detected body motion of the user while operating the content providing device.

16. The information processing apparatus according to claim 14, wherein the sensor is a microphone, and the microphone is configured to generate taste information based on results of detected sounds made by the user while operating the content providing device.

17. The information processing apparatus according to claim 14, wherein the sensor is a thermometer configured to measure the body temperature of the user, and configured to generate taste information based on the measured body temperature of the user while operating the content providing device.

18. The information processing apparatus according to claim 14, wherein the sensor is configured to generate taste information based on detected physical characteristics of the user while operating the content providing device and based on a type of content being provided during monitoring of the user.

19. The information processing apparatus according to claim 1, wherein the component includes attribute information, and the creating means creates the content using CG script to insert and animate the component within the piece of programming in accordance with the attribute information and the motion information.

20. The information processing apparatus according to claim 1, wherein the construction information further includes a background and background music to be inserted in the content of the piece of programming.

\* \* \* \* \*